(12) United States Patent
Togino

(10) Patent No.: US 6,603,608 B2
(45) Date of Patent: Aug. 5, 2003

(54) VARIABLE FOCAL LENGTH OPTICAL ELEMENT AND OPTICAL SYSTEM USING THE SAME

(75) Inventor: Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 125 days.

(21) Appl. No.: 09/934,684

(22) Filed: Aug. 23, 2001

(65) Prior Publication Data

US 2002/0101666 A1 Aug. 1, 2002

(30) Foreign Application Priority Data

Aug. 23, 2000 (JP) ........................................ 2000-251869
Jan. 16, 2001 (JP) ........................................ 2001-007199

(51) Int. Cl.[7] .......................... G02B 15/14; G02B 23/00
(52) U.S. Cl. ........................................ 359/676; 359/422
(58) Field of Search ................................. 359/364, 422, 359/676, 670, 678

(56) References Cited

U.S. PATENT DOCUMENTS 3,507,565 A * 4/1970 Alverez et al. ............. 351/222
4,925,281 A * 5/1990 Baker ........................... 359/676
6,278,558 B1 * 8/2001 Chang .......................... 359/676
2002/0101666 A1 * 8/2002 Togino ......................... 359/720

FOREIGN PATENT DOCUMENTS

| JP | 6-52335 | 7/1994 |
| JP | 8-292372 | 11/1996 |
| JP | 11-317894 | 11/1999 |
| JP | 11-317895 | 11/1999 |

* cited by examiner

Primary Examiner—Georgia Epps
Assistant Examiner—David N. Spector
(74) Attorney, Agent, or Firm—Pillsbury Winthrop LLP

(57) ABSTRACT

An optical system capable of focal length adjustment and so forth with a simple arrangement in which a desired portion of an optical element is selectively utilized by moving an aperture in a direction approximately perpendicular to the optical axis. The optical system has at least two optical elements and includes a first unit positioned at the object side to form a first image and a second unit for projecting the first image onto an image plane. A deflecting mirror for selecting an optical path is positioned in the vicinity of the first image. The first or second unit is formed from a variable focal length optical element having at least two continuous rotationally asymmetric surfaces.

14 Claims, 18 Drawing Sheets

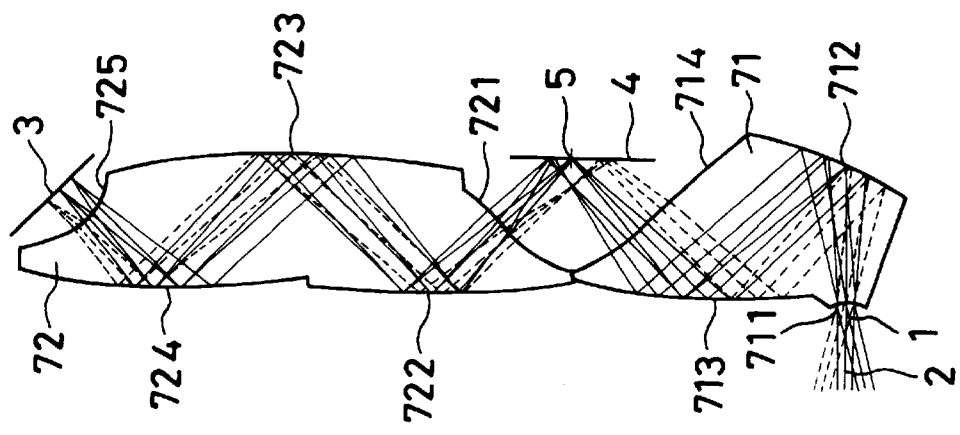
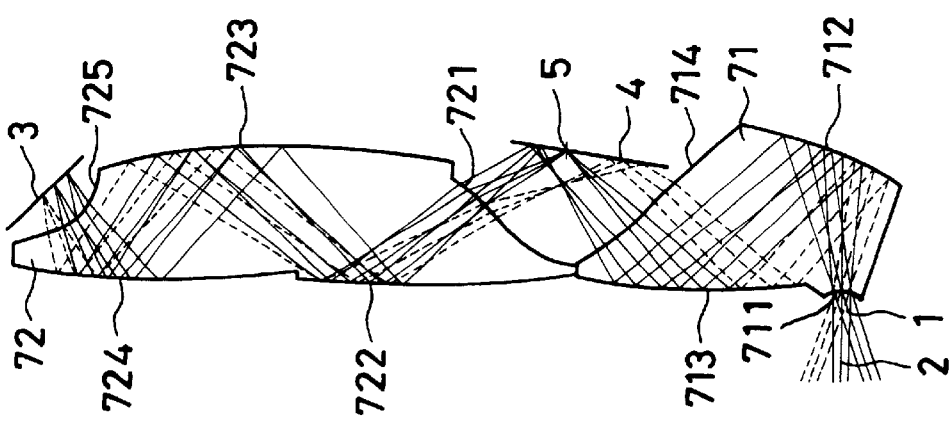

VARIABLE FOCAL LENGTH OPTICAL ELEMENT AND OPTICAL SYSTEM USING THE SAME

This application claims benefit of Japanese Application Nos. 2000-251869 and 2001-7199 filed in Japan on Aug. 23, 2000 and Jan. 16, 2001, respectively, the contents of which are incorporated by this reference.

BACKGROUND OF THE INVENTION

1. Field of the Invention

The present invention relates to a variable focal length optical element and an optical system using the same. More particularly, the present invention relates to a variable focal length optical element for use in an image pickup optical system having a zooming mechanism and a focusing mechanism and also relates to an optical system using such a variable focal length optical element.

2. Discussion of Related Art

Variable-magnification image pickup optical systems using prisms with free-form surfaces are known from Japanese Patent Application Unexamined Publication Numbers [hereinafter referred to as "JP(A)"] 8-292372, 11-317894, 11-317895, etc.

However, JP(A) 8-292372 is arranged to perform zooming by moving a plurality of prisms. Therefore, it is necessary to ensure a space for moving the prisms in the apparatus in advance, which leads to an increase in the size of the apparatus. Further, because the prism moving mechanism needs to move the prisms rectilinearly with high accuracy, the structure becomes complicated. This causes costs to increase and hinders assembling considerably.

Similarly, JP(A) 11-317894 and 11-317895 have a zooming mechanism in which a transmission lens optical element is moved, and hence suffer from the problem that the structure becomes complicated as in the case of the above.

Thus, the above-described conventional techniques need to ensure a space for moving an optical element in advance. That is, it is necessary to ensure a useless space. Therefore, it is impossible with the conventional techniques to construct a compact variable-magnification optical system. In addition, the optical element per se produces aberrations. Therefore, it cannot be used to change optical parameters to a considerable extent.

Common zooming and focus adjustment are generally effected by moving some optical elements in the optical system along the optical axis direction. However, this method has the disadvantage that it is difficult to move the optical elements completely parallel to the optical axis. Tilt or decentration of the optical elements causes the image quality to be degraded. In particular, it has heretofore been impossible to construct a variable-magnification optical system for use with a small-sized image pickup device because the requirement for the accuracy of movement is very strict.

SUMMARY OF THE INVENTION

The present invention was made in view of the above-described problems with the prior art.

An object of the present invention is to provide an image-forming optical system or the like capable of focal length adjustment, focus adjustment, etc. with a simple arrangement in which a desired portion of an optical element is selectively utilized by moving an aperture in a direction approximately perpendicular to the optical axis.

To attain the above-described object, the present invention provides a variable focal length optical element having at least one continuous rotationally asymmetric surface. The optical power of the optical element is variable by selecting an optical path through an aperture.

In this case, it is possible to obtain an image-forming optical system capable of adjusting the focal length, the image-formation position, etc. with a simple arrangement in which a desired portion of the optical element is selectively utilized by moving the aperture in a direction approximately perpendicular to the optical axis.

It is desirable that the relationship A between the size D of the aperture and the amount of movement d of the aperture, i.e. A=D/d, should satisfy the following condition:

$$0.01 < A < 1 \tag{1}$$

The reasons for adopting the above-described arrangements in the present invention, together with the functions thereof, will be described below.

FIG. 1 is a diagram schematically showing light rays in the meridional section of an image-forming optical system (optical element) S substantially corrected for spherical aberration, curvature of field, astigmatism, distortion, axial chromatic aberration and lateral chromatic aberration but allowed to generate large comatic aberration. Because of the large comatic aberration, light rays ①, ② and ③ emanating from an object O at different field angles are incident on different positions on an image plane I. Accordingly, if the position of the aperture of the image-forming optical system S is moved from $P_1$ through $P_2$ to $P_3$ in a direction approximately perpendicular to the optical axis (herein assumed to be an axial principal ray passing through the center of each of the apertures $P_1$, $P_2$ and $P_3$ and reaching the center of the image plane, although the optical axis is defined by an axial principal ray passing through the center of the entrance pupil and reaching the center of the image plane), light rays passing through the image-forming optical system S change their passing position and angle, i.e. ①→②→③, and are incident on the image plane I at different heights $H_1$, $H_2$ and $H_3$. Therefore, the image-formation magnification of the object O on the image plane I varies according to the position of the aperture. Accordingly, the magnification can be varied by moving a stop constituting each aperture in a direction approximately perpendicular to the optical axis. On the same principle, the image-formation position and the principal point position can be adjusted by moving the pupil position in a direction approximately perpendicular to the optical axis. It should be noted that the aperture position can also be moved in a direction perpendicular to the plane of the figure. Therefore, it is possible to effect zooming, for example, by movement in the plane of the figure and to perform focusing, for example, by movement in a direction perpendicular to the plane of the figure.

It is preferable that the relationship A between the size D of the aperture, which limits the cross-sectional area of a beam of light, and the amount of movement d of the aperture, i.e. A=D/d, should satisfy the following condition:

$$0.01 < A < \tag{1}$$

It should be noted that when the aperture is projected within the variable focal length optical element by an optical path selecting device for selecting an optical path, D and d correspond to the size of the aperture and the amount of movement thereof within the variable focal length optical element.

If A is not larger than the lower limit of the condition (1), i.e. 0.01, the amount of movement of the aperture becomes excessively large in comparison to the size of the aperture. Consequently, it becomes impossible to construct a compact optical element, which is one object to be attained by the variable focal length optical element according to the present invention. If A is not smaller than the upper limit of the condition (1), i.e. 1, the required amount of movement of the aperture cannot satisfactorily be ensured. Consequently, it becomes impossible to make the focal length variable.

It should be noted that in Example 4 (described later), D, d and A are as follows:

| D | d | A |
|---|---|---|
| 1.15 | 5.34 | 0.22 |

In addition, the present invention provides an optical system having at least two optical elements. The optical system includes a first unit and a second unit. The first unit is positioned at the object side of the optical system to form a first image. The second unit projects the first image onto an image plane. An optical path selecting device for selecting an optical path is positioned in the vicinity of the first image. Either the first or second unit includes a variable focal length optical element having at least two continuous rotationally asymmetric surfaces.

In this case, it is desirable that an optical path in the variable focal length optical element should be selected by a combination of the aperture and the optical path selecting device positioned in the vicinity of the first image.

The optical path selecting device may be a light-deflecting device positioned in the vicinity of the first image to change the position and direction of a light beam entering the second unit behind the first image, thereby adjusting at least one of the focal length, the image-formation position, the image-formation magnification, and the principal point position.

The following is a description of the reasons for adopting the above-described arrangements in the present invention, together with the functions thereof. As will be clear from FIG. 1, the arrangement in which the aperture is moved within the effective diameter of the image-forming optical system S from $P_1$ through $P_2$ to $P_3$ causes the effective diameter of the image-forming optical system S to increase unfavorably. To avoid this problem, as shown in FIG. 2, an optical system (first unit) S' is added, and a deflecting mirror M is positioned in the vicinity of an intermediate image (first image) plane of the object O. By changing the deflection angle with the deflecting mirror M, the same effect as the movement of the aperture in FIG. 1 is obtained. Thus, light rays ①, ② and ③ are incident on the image plane I at different heights $H_1$, $H_2$ and $H_3$ according to the deflection angle of the deflecting mirror M to form images of the object O at different image-formation magnifications in the same way as in FIG. 1. In this case, the image-formation position and the principal point position can also be adjusted by changing the deflection angle of the deflecting mirror M. If two axes of rotation are set for the deflecting mirror M in a direction perpendicular to the plane of the figure and in the plane of the figure, for example, zooming and focusing can be effected separately.

The optical system may also be arranged as follows. The first unit is formed as a variable focal length optical element, and an aperture for forming an exit pupil is positioned in the second unit. The position of an entrance pupil conjugate to the aperture positioned in the second unit is moved relative to the first unit by the optical path selecting device positioned in the vicinity of the first image, thereby adjusting at least one of the focal length, the image-formation position, the image-formation magnification, and the principal point position.

Further, the optical path selecting device can be implemented by moving the aperture (stop) itself. It is also possible to make both the first and second units operate as a variable focal length optical element.

In addition, the present invention provides another variable focal length optical element having at least one discontinuous rotationally asymmetric surface. The optical power of the optical element is variable by selecting an optical path through an aperture.

In this case, it is possible to obtain an image-forming optical system capable of adjusting the focal length, the image-formation position, etc. with a simple arrangement in which a desired portion of the optical element is selectively utilized by moving the aperture in a direction approximately perpendicular to the optical axis.

In the foregoing optical system and another variable focal length optical element according to the present invention, if an optical path selecting device is used, it is preferable that the width a of oscillation of the axial principal ray caused by the optical path selecting device should satisfy the following condition:

$$0° < \alpha < 90° \tag{2}$$

If $\alpha$ is not larger than the lower limit of the condition (2), i.e. 0°, it becomes impossible to select an optical path and hence impossible to change optical parameters. If $\alpha$ is not smaller than the upper limit, i.e. 90°, the size of the variable focal length optical element becomes unfavorably large.

It is even more desirable to satisfy the following condition:

$$0° < \alpha < 45° \tag{2-1}$$

If the foregoing optical system and another variable focal length optical element according to the present invention are used to perform zooming, it is still more desirable to satisfy the following condition:

$$10° < \alpha < 45° \tag{3}$$

If $\alpha$ is not larger than the lower limit of the condition (3), i.e. 10°, local power change in the continuous rotationally asymmetric surface becomes unfavorably large. Consequently, it becomes difficult to obtain a favorable aberration condition throughout the image field. If $\alpha$ is not smaller than the upper limit, i.e. 45°, the size of the variable focal length optical element becomes unfavorably large.

If the foregoing optical system and another variable focal length optical element according to the present invention are used to effect focusing, it is important to satisfy the following condition:

$$0° < \alpha < 30° \tag{4}$$

The upper limit of the above condition (4) is set at 30° because focusing does not need to change the focal length of the optical system to a considerable extent. If $\alpha$ is not smaller than the upper limit, i.e. 30°, the size of the variable focal length optical element becomes unfavorably large.

It should be noted that the values of ax in Examples 2, 3, 5 to 11 (described later) are as follows:

| Example | α |
|---------|-------|
| 2 | 22.01° |
| 3 | 32.40° |
| 5 | 22.40° |
| 6 | 33.96° |
| 7 | 34.40° |
| 8 | 2.79° |
| 9 | 28.83° |
| 10 | 22.50° |
| 11 | 25.81° |

It has been stated above that the variable focal length optical element or optical system according to the present invention can perform zooming and so forth from the viewpoint of aberrations. However, the present invention can also be described as being arranged as follows. The optical power in the effective surface of the optical element or the optical system is arranged to change continuously in the surface, and the working area of the optical element or the optical system is selected by movement of the aperture (pupil) in a direction perpendicular to the optical axis, thereby continuously or discontinuously adjusting optical parameters of the image-forming optical system, such as the magnification or focal length, the principal point position and so forth, without moving another optical element. It should be noted that an arrangement for discontinuously adjusting optical parameters of the optical element or the optical system may be formed by using a single free-form surface. However, it is also possible to use a discontinuous free-form surface formed by juxtaposing a plurality of free-form surfaces (a description of free-form surfaces will be given later).

It should be noted that the optical element or optical system capable of adjusting at least one of the focal length, the image-formation position, the image-formation magnification, and the principal point position by movement of the aperture position in a direction approximately perpendicular to the optical axis as stated above can be used to form, for example, a refracting optical system, a reflecting optical system or a catadioptric (reflective refracting) optical system that has at least one continuous rotationally asymmetric surface as in Examples of the present invention (described later).

In the present invention, a free-form surface is used as a typical example of a rotationally asymmetric surface. A free-form surface is defined by the following equation. The Z-axis of the defining equation is the axis of a free-form surface.

$$Z = cr^2 / \left[1 + \sqrt{1 - (1+k)c^2 r^2}\right] + \sum_{j=2}^{66} C_j X^m Y^n \quad (a)$$

In the equation (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n = C_2 X + C_3 Y + C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 +$$
$$C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 +$$
$$C_{26} X^2 Y^4 + C_{27} XY^5 + C_{28} Y^6 +$$
$$C_{29} X^7 + C_{30} X^6 Y + C_{31} X^5 Y^2 + C_{32} X^4 Y^3 +$$
$$C_{33} X^3 Y^4 + C_{34} X^2 Y^5 + C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

In addition, free-form surfaces as the above-described surfaces with a rotationally asymmetric curved surface configuration may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), R is the distance from the Z-axis in the XY-plane, and A is the azimuth angle about the Z-axis, which is expressed by the angle of rotation measured from the X-axis.

$x = R \times \cos(A)$ $y = R \times \sin(A)$ $$Z = D_2 + D_3 R\cos(A) + D_4 R\sin(A) + \quad (b)$$
$$D_5 R^2 \cos(2A) + D_6(R^2 - 1) + D_7 R^2 \sin(2A) +$$
$$D_8 R^3 \cos(3A) + D_9(3R^3 - 2R)\cos(A) +$$
$$D_{10}(3R^3 - 2R)\sin(A) + D_{11} R^3 \sin(3A) +$$
$$D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) +$$
$$D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$

-continued $$D_{25}(15R^6 - 20R^4 + 6R^2)\cos(2A) +$$

$$D_{26}(20R^6 - 30R^4 + 12R^2 - 1) +$$

$$D_{27}(15R^6 - 20R^4 + 6R^2)\sin(2A) +$$

$$D_{28}(6R^6 - 5R^4)\sin(4A) + D_{29}R^6\sin(6A) \ldots$$

where $D_m$ (m is an integer of 2 or higher) are coefficients.

It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ ... should be used.

The above defining equations are shown to exemplify surfaces with a rotationally asymmetric curved surface configuration. Therefore, the same advantageous effects can be obtained for any other defining equation that expresses such a rotationally asymmetric curved surface configuration.

It should be noted that other examples of defining equations for free-form surfaces include the following defining equation (c):

$$Z = \Sigma\Sigma C_{nm} XY \quad (c)$$

Assuming that k=7 (polynomial of degree 7), for example, a free-form surface is expressed by an expanded form of the above equation as follows:

$$Z = C_2 + C_3 Y + C_4|X| + \quad (c)$$
$$C_5 Y^2 + C_6 Y|X| + C_7 X^2 +$$
$$C_8 Y^3 + C_9 Y^2 |X| + C_{10} YX^2 + C_{11}|X^3| +$$
$$C_{12} Y^4 + C_{13} Y^3 |X| + C_{14} Y^2 X^2 + C_{15} Y|X^3| + C_{16} X^4 +$$
$$C_{17} Y^5 + C_{18} Y^4 |X| + C_{19} Y^3 X^2 + C_{20} Y^2 |X^3| +$$
$$C_{21} YX^4 + C_{22}|X^5| +$$
$$C_{23} Y^6 + C_{24} Y^5 |X| + C_{25} Y^4 X^2 + C_{26} Y^3 |X^3| +$$
$$C_{27} Y^2 X^4 + C_{28} Y|X^5| + C_{29} X^6 +$$
$$C_{30} Y^7 + C_{31} Y^6 |X| + C_{32} Y^5 X^2 + C_{33} Y^4 |X^3| +$$
$$C_{34} Y^3 X^4 + C_{35} Y^2 |X^5| + C_{36} YX^6 + C_{37}|X^7|$$

It should be noted that an anamorphic surface or a toric surface is also usable as a rotationally asymmetric surface.

The following is a description of conditions to be satisfied when an optical system is formed by using a rotationally asymmetric surface. In the variable focal length optical element and optical system according to the present invention, powers Px and Py are defined in the same way as in the paragraph [0049] in JP(A) 11-194267 with respect to light rays in two directions in YZ- and XZ-planes containing the optical axis and perpendicularly intersecting each other. That is, the axial principal ray and a light ray that is parallel to and at a slight distance away from the axial principal ray are made to enter the optical element or the optical system to define powers Px and Py, and the reciprocals of the powers are defined as focal lengths Fx and Fy. It is important that the ratio Fy/Fx should satisfy the following condition:

$$0.5 < |Fy/Fx| < 2 \quad (5)$$

If |FY/Fx| is not larger than the lower limit of the condition (5), i.e. 0.5, the focal length in the X-direction becomes excessively long in comparison to the focal length in the Y-direction. Consequently, the image is formed excessively large in the X-direction. That is, a distorted image having a horizontally elongated rectangular shape is formed undesirably. If |Fy/Fx| is not smaller than the upper limit, i.e. 2, the focal length in the X-direction becomes excessively short in comparison to the focal length in the Y-direction. Consequently, the image becomes relatively small in the X-direction. That is, a distorted image having a vertically elongated rectangular shape is formed undesirably.

In the case of an optical system allowing the focal length to be changed as in the present invention, it is important that the above condition (5) should be satisfied in each of positions changed from one to another. If the condition (5) is not satisfied in all positions from the wide-angle end to the telephoto end or in all positions during focusing from an infinite distance to a near point, the change of image distortion during zooming or focusing becomes unnatural. Consequently, the image obtained becomes very difficult to see.

It is preferable to satisfy the following condition:

$$0.7 < |Fy/Fx| < 1.3 \quad (5-1)$$

The meaning of the upper and lower limits of the condition (5-1) is the same as that of the upper and lower limits of the condition (5).

In Examples 1 to 11 (described later), Fx, Fy and Fy/Fx are as follows (W is the wide-angle end; S is the standard position; T is the telephoto end; D is the diopter; and the units of length are millimeter):

|  | Fx | Fy | Fy/Fx |
|---|---|---|---|
| Example 1 |  |  |  |
| W | 7.9554 | 7.2419 | 0.9103 |
| S | 10.0604 | 9.3647 | 0.9309 |
| T | 12.9870 | 13.6834 | 1.0536 |
| Example 2 |  |  |  |
| W | 8.2237 | 7.1614 | 0.9708 |
| S | 11.1359 | 10.9183 | 0.9805 |
| T | 14.7929 | 14.9346 | 1.0096 |
| Example 3 |  |  |  |
| W | 6.3412 | 6.5812 | 1.0379 |
| S | 9.7371 | 9.4429 | 0.9698 |
| T | 14.9346 | 12.5953 | 0.9396 |
| Example 4 |  |  |  |
| W | 12.3108 | 12.5156 | 0.9836 |
| S | 13.7931 | 14.3472 | 0.9614 |
| T | 19.0348 | 15.9236 | 1.1954 |
| Example 5 |  |  |  |
| W | 3.1665 | 3.0303 | 1.0449 |
| S | 4.3103 | 4.3975 | 0.9802 |
| T | 5.9998 | 5.9844 | 1.0026 |
| Example 6 |  |  |  |
| W | 2.9238 | 3.2616 | 0.8964 |
| S | 4.2018 | 4.6019 | 0.9130 |
| T | 4.7735 | 5.4885 | 0.8697 |
| Example 7 |  |  |  |
| W | 3.2182 | 4.4903 | 0.7167 |
| S | 4.5683 | 6.2112 | 0.7355 |
| T | 5.9204 | 7.2411 | 0.8176 |
| Example 8 |  |  |  |
| ∞ | 4.7506 | 4.9801 | 0.9539 |

-continued

| | Fx | Fy | Fy/Fx |
|---|---|---|---|
| 2D | 4.7142 | 4.9505 | 0.9523 |
| 4D | 4.5855 | 4.8473 | 0.9460 |
| Example 9 | | | |
| W | 3.2888 | 3.2520 | 1.0113 |
| S | 4.5893 | 4.5872 | 1.0005 |
| T | 6.7874 | 6.6007 | 1.0283 |
| Example 10 | | | |
| W | 4.2171 | 3.9066 | 1.0795 |
| S | 4.7298 | 4.5977 | 1.0287 |
| T | 5.7320 | 6.2944 | 0.9106 |
| Example 11 | | | |
| W | 3.9878 | 4.5045 | 0.8853 |
| S | 5.7405 | 5.7372 | 1.0006 |
| T | 7.7889 | 7.7882 | 1.0001 |

The above-described optical element and optical system according to the present invention can be used as an image pickup optical system, a projection optical system, an ocular optical system, etc.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 9 is a sectional view showing a variable-magnification optical system according to Example 7 at the wide-angle end (a), standard position (b) and telephoto end (c).

DESCRIPTION OF THE PREFERRED EMBODIMENTS

Specific Examples 1 to 11 of the optical system according to the present invention will be described below.

Figure 1:
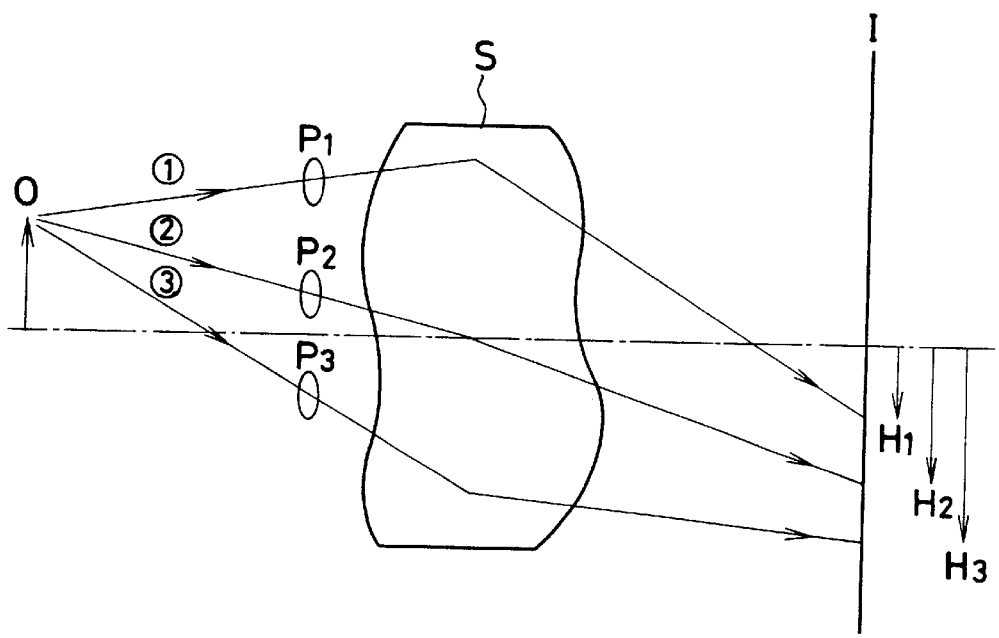
FIG. 1 is a diagram for describing the reason why zooming and so forth can be effected in an image-forming optical system according to the present invention.
Figure 2:
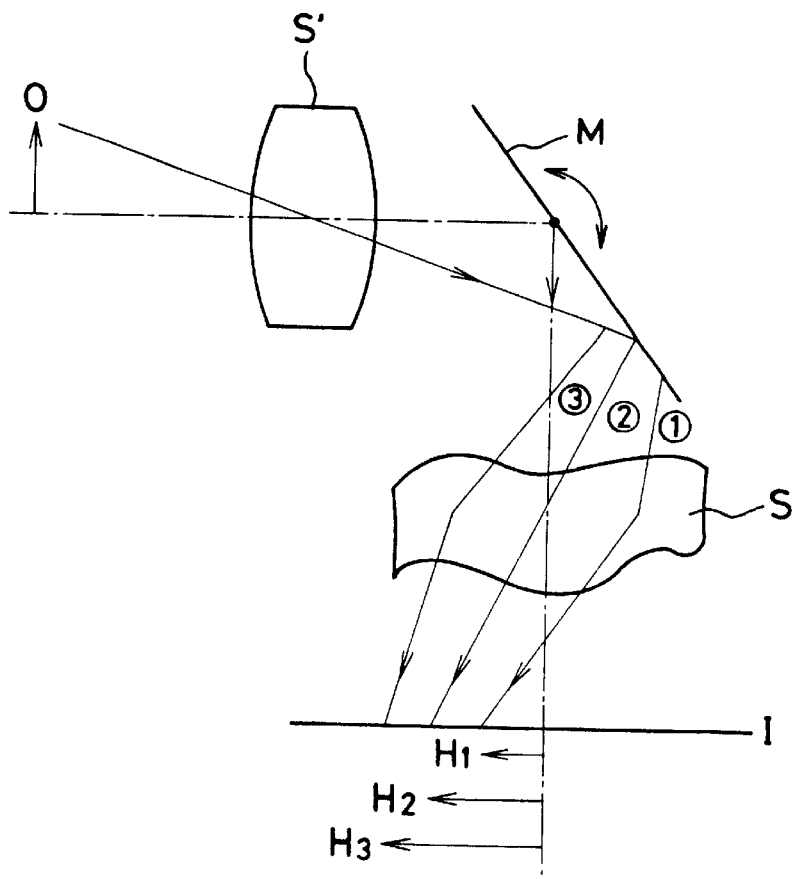
FIG. 2 is a diagram for describing the reason why zooming and so forth can be effected by rotational control of a deflecting mirror in the present invention.
Figure 3A:
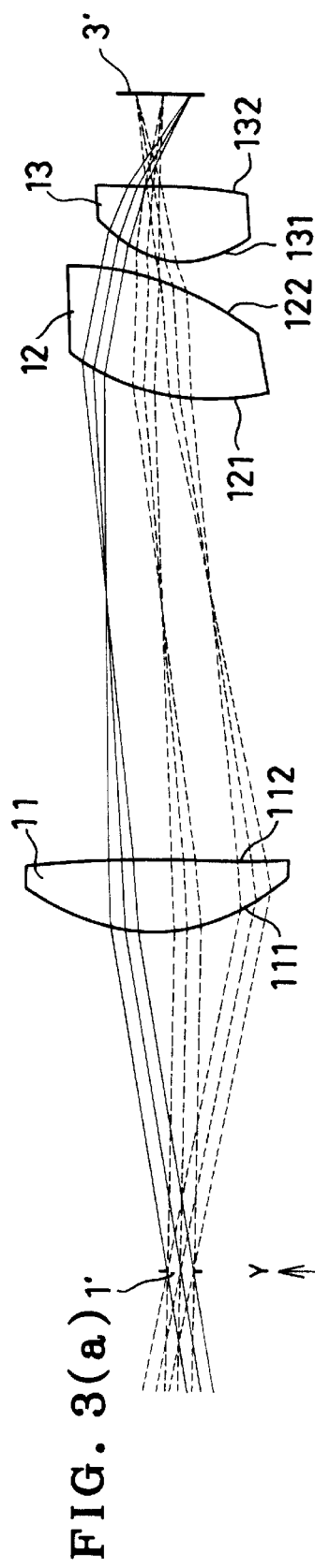
FIG. 3 is a sectional view showing a variable-magnification optical system according to Example 1 at the wide-angle end (a), standard position (b) and telephoto end (c).
Figure 3B:
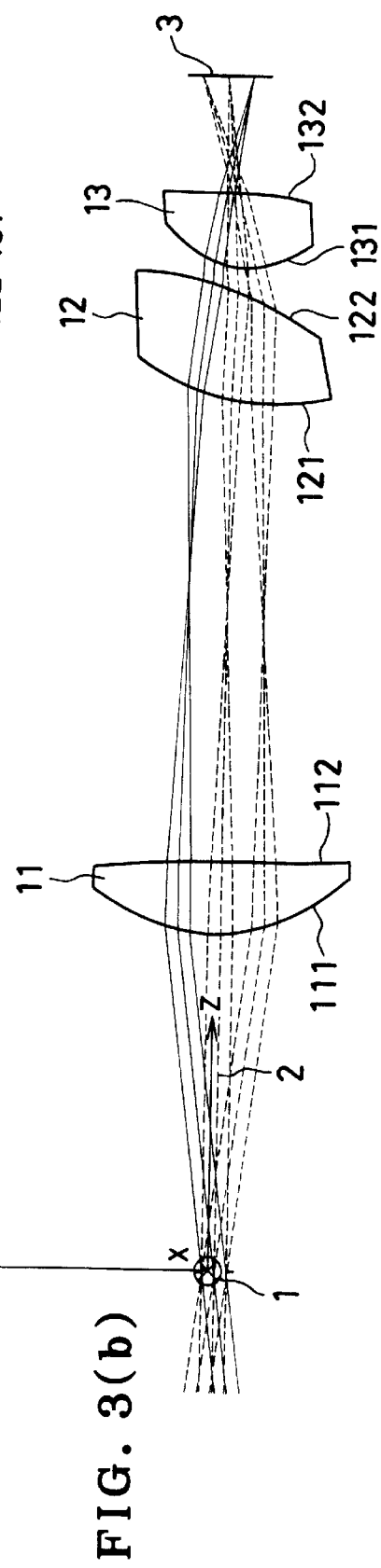
Figure 3C:
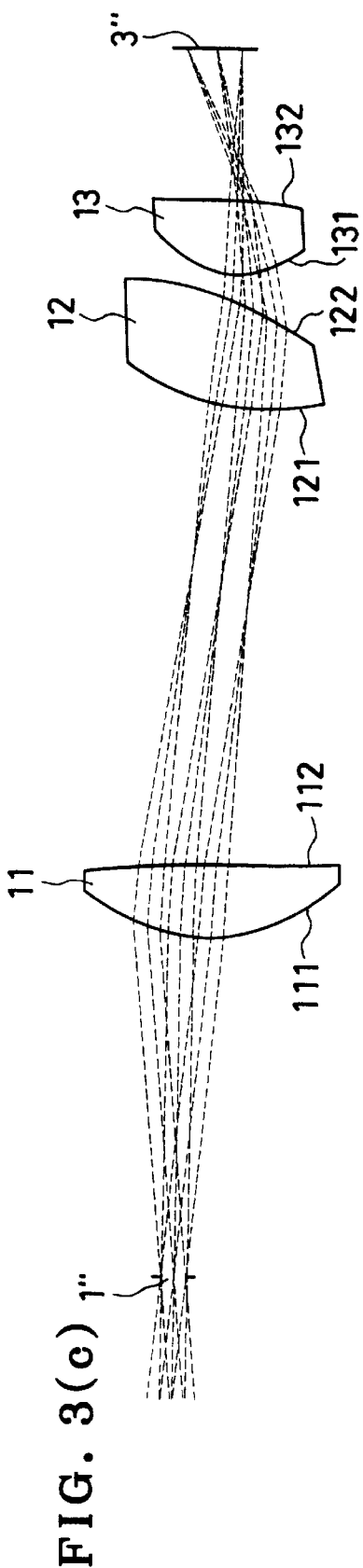

Constituent parameters in Examples 1 to 11 will be shown later. In each Example, a coordinate system is defined as shown in FIG. 3 on the basis of forward ray tracing. In Examples 1 to 3 and 5 to 10, an axial principal ray 2 is defined by a light ray passing perpendicularly through the center of an entrance pupil 1 of the optical system in the standard position [part (b) of FIG. 3] and reaching the center of an image plane 3. Further, in the forward ray tracing, the center of the entrance pupil 1 is defined as the origin of each decentered optical surface constituting a decentered optical system. The direction along which the axial principal ray 2 travels until it intersects a first surface 111 of the optical system is defined as a Z-axis. The direction in which the Z-axis extends from the pupil 1 toward the first surface 111 is defined as a positive direction of the Z-axis. The plane of the figure is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis. In Examples 4 and 11, the vertex of the first surface of the optical system is defined as the origin of each decentered optical surface constituting a decentered optical system. The direction along which the axial principal ray 2 travels until it intersects the first surface of the optical system is defined as a Z-axis. The direction in which the axial principal ray 2 is incident on the first surface of the optical system is defined as a positive direction of the Z-axis. The plane of the figure is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces] with respect to the X-, Y- and Z-axes (α, β and γ, respectively). In this case, the positive α and β mean counterclockwise rotation relative to the positive directions of the corresponding axes, and the positive γ means clockwise rotation relative to the positive direction of the Z-axis. It should be noted that the way of rotating the center axis of each surface through α, β and γ is as follows. First, the center axis of the surface and the XYZ orthogonal coordinate system are rotated through α counterclockwise about the X-axis. Then, the rotated center axis of the surface is rotated through β counterclockwise about the Y-axis of the new coordinate system, and the coordinate system once rotated is also rotated through β counterclockwise about the Y-axis. Then, the center axis of the surface, which has been rotated twice, is rotated through γ clockwise about the Z-axis of the new coordinate system.

Among optical functional surfaces constituting the optical system in each Example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

First, the image pickup device size, entrance pupil diameter, field angles, focal length and F-number in each Example are shown. The focal length and F-number are those calculated from the horizontal field angle and the image height.

In Examples 1 to 3, an image pickup device of 3.2×2.4 millimeters in size is used, and the entrance pupil diameter is 1.15 millimeters. The field angles, focal length and F-number are as follows:

|  | Telephoto end | Standard position | Wide-angle end |
| --- | --- | --- | --- |
| Vertical half field angle | 10.17 | 7.28 | 5.25 (°) |
| Horizontal half field angle | 13.15 | 9.54 | 6.94 (°) |
| Focal length | 6.84 | 9.52 | 13.14 (mm) |
| F-number | 5.95 | 8.27 | 11.43 |

In Example 4, an image pickup device of 8×6 millimeters in size is used, and the entrance pupil diameter is 1.15 millimeters. The field angles, focal length and F-number are as follows:

|  | Telephoto end | Standard position | Wide-angle end |
| --- | --- | --- | --- |
| Vertical half field angle | 18.31 | 13.10 | 9.45 (°) |
| Horizontal half field angle | 23.60 | 17.18 | 12.50 (°) |
| Focal length | 9.16 | 12.94 | 18.4 (mm) |
| F-number | 7.97 | 11.25 | 16.0 |

In Examples 5 to 11, an image pickup device of 3.2×2.4 millimeters in size is used, and the entrance pupil diameter is 1.15 millimeters. In Examples 5 to 7, 9 and 10, the field angles, focal length and F-number are as follows:

|  | Telephoto end | Standard position | Wide-angle end |
| --- | --- | --- | --- |
| Vertical half field angle | 20.34 | 14.55 | 10.50 (°) |
| Horizontal half field angle | 26.31 | 19.09 | 13.89 (°) |
| Focal length | 3.24 | 4.62 | 6.47 (mm) |
| F-number | 2.8 | 4.0 | 5.6 |

In Example 8, the field angles, focal length and F-number are as follows:

| Vertical half field angle: | 14.55 (°) |
| --- | --- |
| Horizontal half field angle: | 19.09 (°) |
| Focal length: | 4.62 (mm) |
| F-number: | 4.0 |

In Example 11, the field angles, focal length and F-number are as follows:

|  | Telephoto end | Standard position | Wide-angle end |
| --- | --- | --- | --- |
| Vertical half field angle | 18.31 | 13.10 | 9.45 (°) |
| Horizontal half field angle | 23.68 | 17.18 | 12.50 (°) |
| Focal length | 3.65 | 5.18 | 7.22 (mm) |
| F-number | 3.17 | 4.50 | 6.28 |

EXAMPLE 1

FIG. 3 is a sectional view showing a variable-magnification optical system according to Example 1 at the wide-angle end (a), standard position (b) and telephoto end (c). As shown in FIG. 3, the variable-magnification optical system according to this Example has three refractive optical elements 11 to 13 formed from rotationally asymmetric free-form surfaces. The variable-magnification optical system includes a first unit and a second unit. The first unit has the refractive optical element 11 to form a first image (intermediate image) of a distant object. The second unit has the refractive optical elements 12 and 13 to perform mainly zooming.

A stop 1 is positioned at the entrance side of the optical system. As the stop 1 is moved in a direction perpendicular to an optical axis 2, an entrance pupil through which light rays enter the second unit, which is arranged as a zooming unit, is also moved in a direction perpendicular to the optical axis 2, thereby effecting zooming.

The second unit has the function of projecting the first image formed by the first unit onto an image plane 3. The second unit also has the function of varying the projection magnification according to the inclination of emergent principal rays from the first image.

More specifically, part (b) of FIG. 3 shows the variable-magnification optical system in a standard position. The entrance pupil in this position is denoted by reference numeral 1, and the image plane is denoted by reference numeral 3. Part (a) of FIG. 3 shows the variable-magnification optical system in a wide-angle position. Zooming is effected by moving the stop 1 downward in a direction perpendicular to the optical axis 2 to a position lower than the stop position in the standard position shown in part (b) of FIG. 3. The entrance pupil in the wide-angle position is denoted by reference numeral 1', and the image plane is denoted by reference numeral 3'. Part (c) of FIG. 3 shows the variable-magnification optical system in a telephoto position. Zooming is effected by moving the stop 1 upward in a direction perpendicular to the optical axis 2 to a position higher than the stop position in the standard position shown in part (b) of FIG. 3. The entrance pupil in the telephoto position is denoted by reference numeral 1", and the image plane is denoted by reference numeral 3".

In this Example, the image position shifts as zooming is performed. However, focusing is effected by moving the entire optical system or moving an image pickup device placed in the image plane 3.

In FIG. 3, the object-side surface of the refractive optical element 11 is denoted by reference numeral 111, and the image-side surface thereof is denoted by reference numeral 112. The object-side surface of the refractive optical element 12 is denoted by reference numeral 121, and the image-side surface thereof is denoted by reference numeral 122. The object-side surface of the refractive optical element 13 is denoted by reference numeral 131, and the image-side surface thereof is denoted by reference numeral 132.

EXAMPLE 2

Figure 4A:
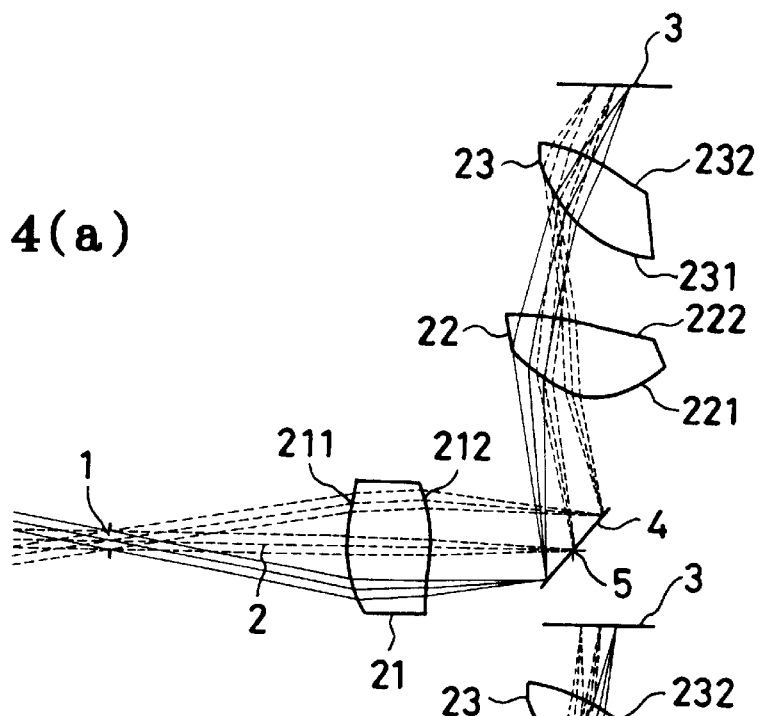
FIG. 4 is a sectional view showing a variable-magnification optical system according to Example 2 at the wide-angle end (a), standard position (b) and telephoto end (c).
Figure 4B:
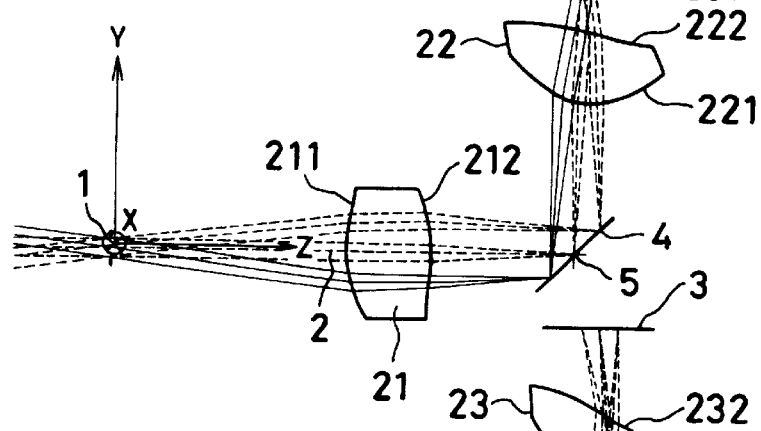
Figure 4C:
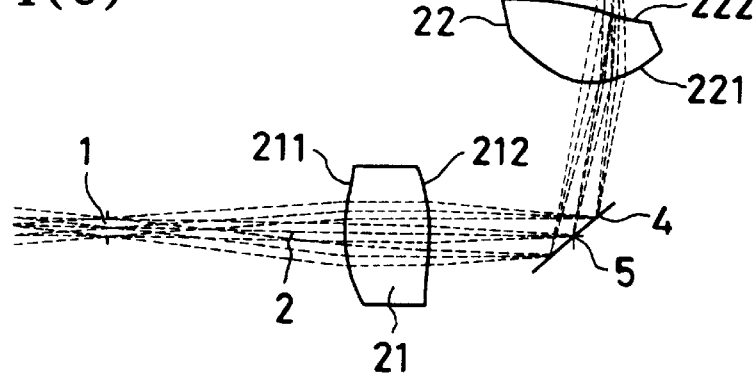

FIG. 4 is a sectional view showing a variable-magnification optical system according to Example 2 at the wide-angle end (a), standard position (b) and telephoto end (c). As shown in FIG. 4, the variable-magnification optical system according to this Example has three refractive optical elements 21 to 23 formed from rotationally asymmetric free-form surfaces. The variable-magnification optical system includes a first unit and a second unit. The first unit has the refractive optical element 21 to form a first image (intermediate image) of a distant object. The second unit has the refractive optical elements 22 and 23 to perform mainly zooming.

In this Example, a deflecting mirror 4 is placed in the vicinity of the first image (intermediate image) formed by the first unit to move the entrance pupil relative to the second unit. The deflecting mirror 4 is rotatable about an axis 5.

In this Example, the stop 1 positioned at the entrance side of the optical system to define an entrance pupil of the optical system is fixed. The image plane 3 is also fixed independently of zooming.

In FIG. 4, the object-side surface of the refractive optical element 21 is denoted by reference numeral 211, and the image-side surface thereof is denoted by reference numeral 212. The object-side surface of the refractive optical element 22 is denoted by reference numeral 221, and the image-side surface thereof is denoted by reference numeral 222. The object-side surface of the refractive optical element 23 is denoted by reference numeral 231, and the image-side surface thereof is denoted by reference numeral 232.

EXAMPLE 3

Figure 5A:
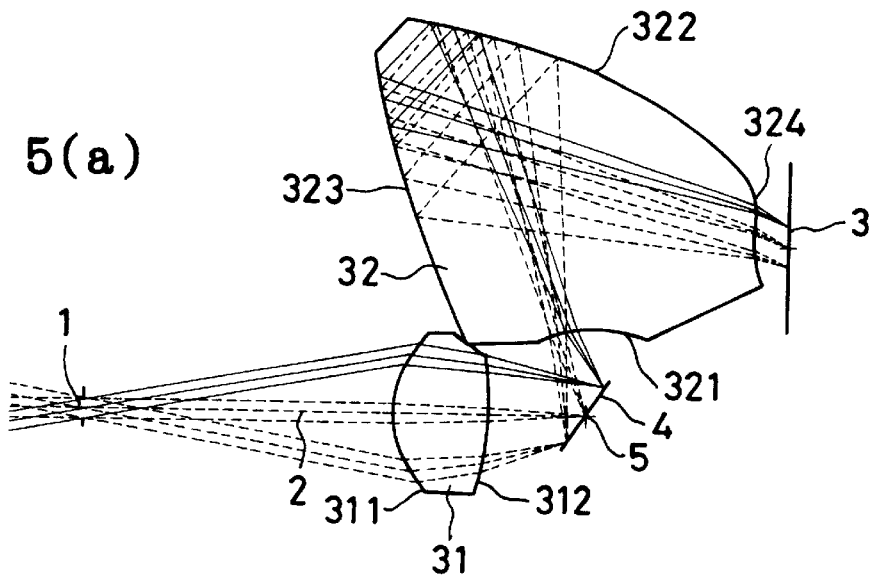
FIG. 5 is a sectional view showing a variable-magnification optical system according to Example 3 at the wide-angle end (a), standard position (b) and telephoto end (c).
Figure 5B:
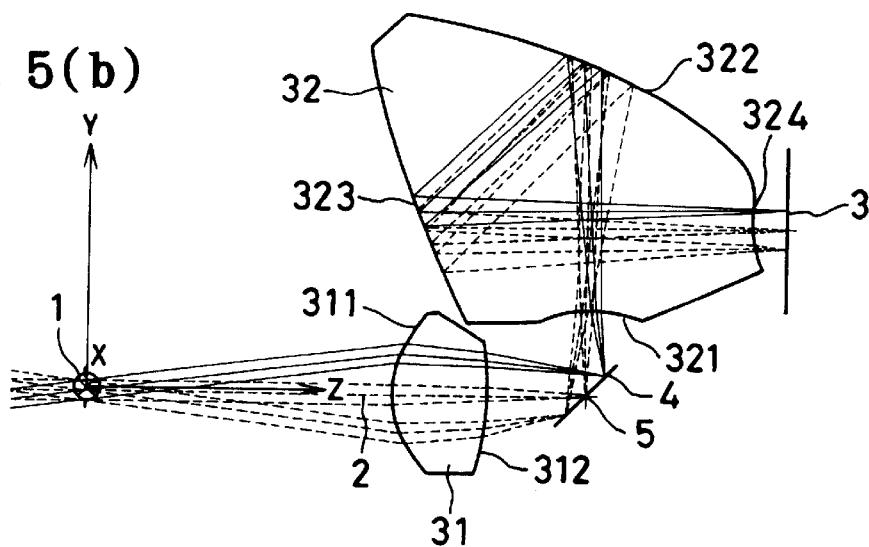
Figure 5C:
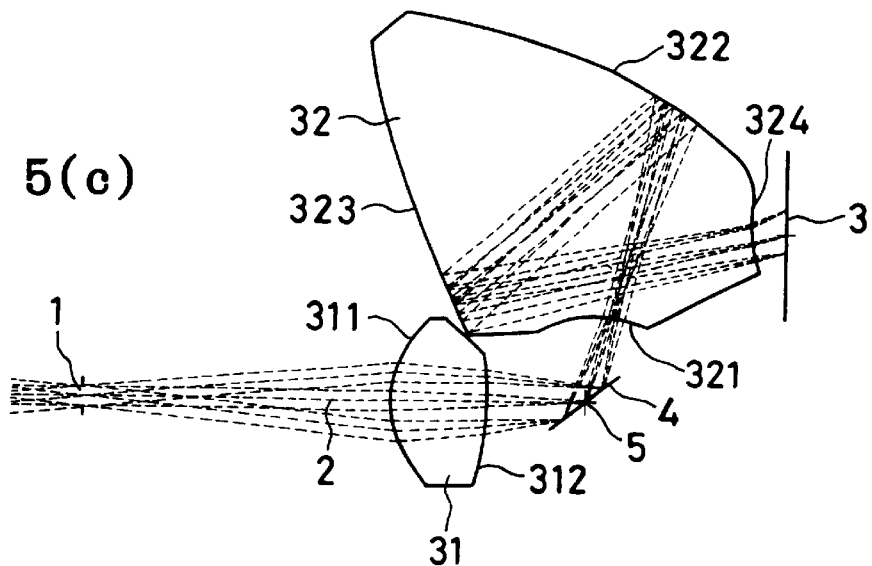

FIG. 5 is a sectional view showing a variable-magnification optical system according to Example 3 at the wide-angle end (a), standard position (b) and telephoto end (c). As shown in FIG. 5, the variable-magnification optical system according to this Example has two optical elements 31 and 32 formed from rotationally asymmetric free-form surfaces. The variable-magnification optical system includes a first unit and a second unit. The first unit has the refractive optical element 31 to form a first image (intermediate image) of a distant object. The second unit has the refractive optical element 32 to perform mainly zooming.

In this Example also, a deflecting mirror 4 is placed in the vicinity of the first image (intermediate image) formed by the first unit to move the entrance pupil relative to the second unit. The deflecting mirror 4 is rotatable about an axis 5.

In this Example, a decentered prism 32 is used as the second unit assigned to perform mainly zooming. The decentered prism 32 has first to fourth surfaces 321 to 324. The first surface 321 is a refracting surface. The second and third surfaces 322 and 323 are internally reflecting surfaces. The fourth surface 324 is a refracting surface. The surfaces 321 to 324 are formed from free-form surfaces. With the prism 32, a surface having a principal power can be formed by using a reflecting surface. Accordingly, aberrations can be minimized, and a sharp image can be formed.

In this Example also, the stop 1 positioned at the entrance side of the optical system to define an entrance pupil of the optical system is fixed, and the image plane 3 is also fixed independently of zooming.

EXAMPLE 4

Figure 6A:
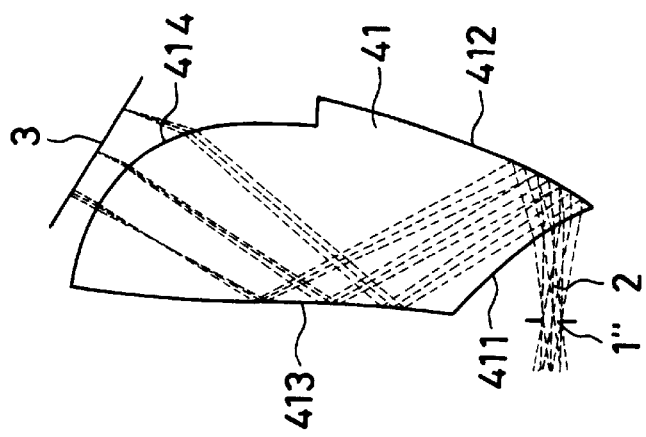
FIG. 6 is a sectional view showing a variable-magnification optical system according to Example 4 at the wide-angle end (a), standard position (b) and telephoto end (c).
Figure 6B:
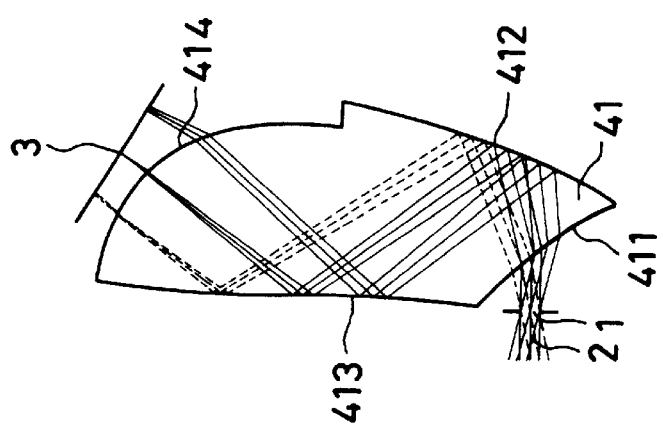
Figure 6C:
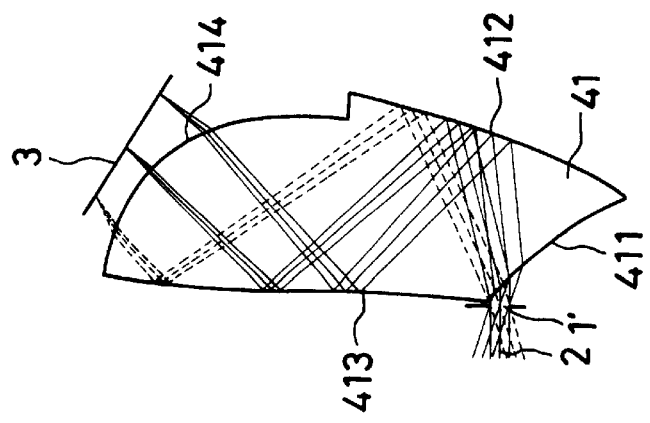

FIG. 6 is a sectional view showing a variable-magnification optical system according to Example 4 at the wide-angle end (a), standard position (b) and telephoto end (c). As shown in FIG. 6, the variable-magnification optical system according to this Example has a single variable focal length optical element 41 formed from rotationally asymmetric free-form surfaces. An optical path is selected by moving a stop 1 positioned at the object side. As the stop 1 is moved, a light beam passing through the variable focal length optical element 41 shifts. Consequently, the refracting power of the optical element 41 changes. Thus, zooming is effected. For this purpose, at least one of the optical surfaces of the optical element 41 is formed from a rotationally asymmetric surface.

More specifically, a decentered prism 41 is used as a single optical element assigned to perform zooming. The decentered prism 41 has first to fourth surfaces 411 to 414. The first surface 411 is a refracting surface. The second and third surfaces 412 and 413 are internally reflecting surfaces. The fourth surface 414 is a refracting surface. The surfaces 411 to 414 are formed from free-form surfaces and arranged to form a Z-shaped optical path. With the prism 41, a surface having a principal power can be formed by using a reflecting surface. Accordingly, aberrations can be minimized, and a sharp image can be formed.

In this Example, each of the surfaces 411 to 414 needs to have a surface configuration having a plane of symmetry coincident with the plane of FIG. 6.

The following Examples 5 to 11 each have two optical elements formed from rotationally asymmetric free-form surfaces. Each of Examples 5 to 11 includes a first unit and a second unit. The first unit is positioned at the object side to form a first image. The second unit projects the first image. A selecting device for selecting an optical path is positioned in the vicinity of the first image.

EXAMPLE 5

Figure 7A:
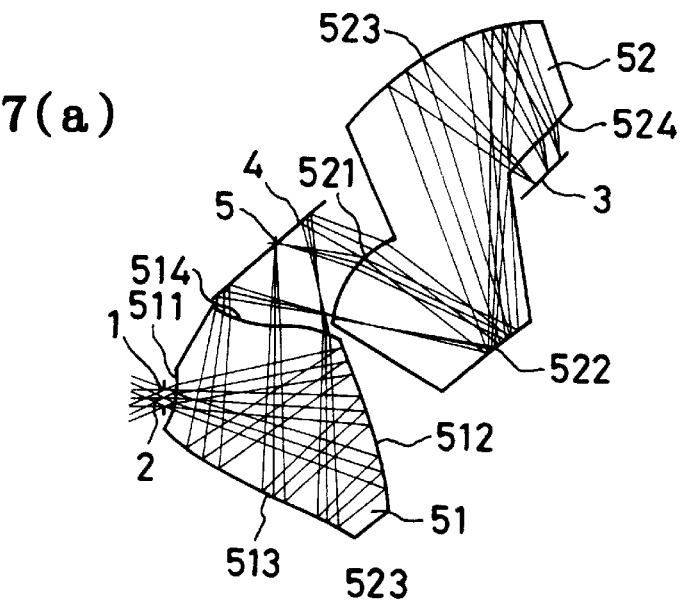
FIG. 7 is a sectional view showing a variable-magnification optical system according to Example 5 at the wide-angle end (a), standard position (b) and telephoto end (c).
Figure 7B:
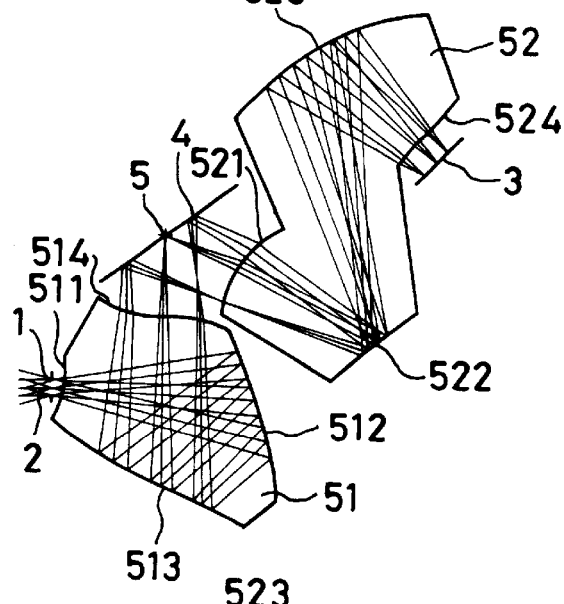
Figure 7C:
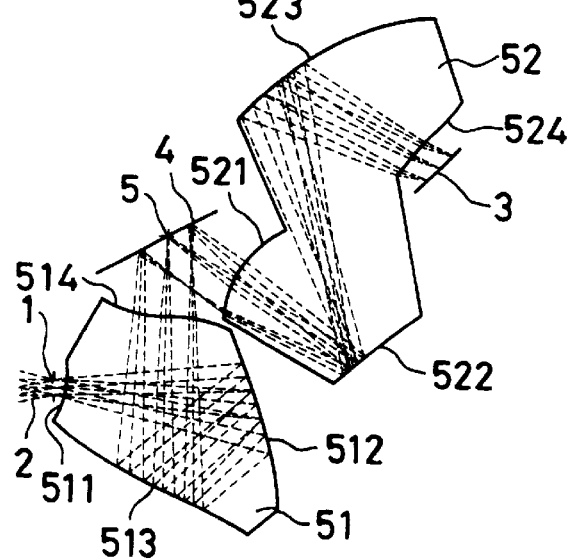

FIG. 7 is a sectional view showing a variable-magnification optical system according to Example 5 at the wide-angle end (a), standard position (b) and telephoto end (c). As shown in FIG. 7, the variable-magnification optical system according to this Example has two optical elements 51 and 52 formed from rotationally asymmetric free-form surfaces. The variable-magnification optical system includes a first unit 51 for forming a first image and a second unit 52 for performing mainly zooming.

A stop 1 is positioned in front of the optical system. The image of the stop 1 is projected between the first unit 51 and the second unit 52. To move the projected stop image, a rotary reflecting mirror 4 is tilted. That is, the rotary reflecting mirror 4 is positioned in the vicinity of the first image formed by the first unit 51. By tilting the rotary mirror 4, the pupil is moved.

The first unit 51 is formed from a prism optical system arranged so that the optical path intersects itself within the prism. The second unit 52 is formed from a prism having a Z-shaped optical path. That is, the optical path does not intersect itself within the prism. More specifically, the first prism 51 has first to fourth surfaces 511 to 514. The first surface 511 is a refracting surface. The second and third surfaces 512 and 513 are internally reflecting surfaces. The fourth surface 514 is a refracting surface. The surfaces 511 to 514 are formed from free-form surfaces. The second prism 52 has first to fourth surfaces 521 to 524. The first surface 521 is a refracting surface. The second and third surfaces 522 and 523 are internally reflecting surfaces. The fourth surface 524 is a refracting surface. The surfaces 521 to 524 are formed from free-form surfaces.

The first image formed by the first prism 51 is projected onto an image plane 3 by the second prism 52. The projection magnification of the second prism 52 is changed by changing the position of light rays passing through the second prism 52 with the rotary reflecting mirror 4 positioned in the vicinity of the first image.

At the wide-angle end, the first image needs to be projected after being reduced in size in comparison to the image projection at the telephoto end. Therefore, it is preferable that the principal point position of the second prism 52 should be relatively close to the image side. Conversely, at the telephoto end, the first image needs to be projected onto the image plane after being enlarged in comparison to the image projection at the wide-angle end. Therefore, it is preferable that the principal point position of the second prism 52 should be relatively close to the object side, that is, in the vicinity of the first image.

More preferably, the optical system is arranged such that a surface having a positive principal power in the second prism 52 is tilted so that the distance between this surface and the image plane 3 is shortened at the wide-angle end but lengthened at the telephoto end. At the same time, it is important that the rotary mirror 4 for selecting an optical path should be arranged to rotate in a direction in which the distance to the image plane 3 is shortened at the wide-angle end.

EXAMPLE 6

Figure 8A:
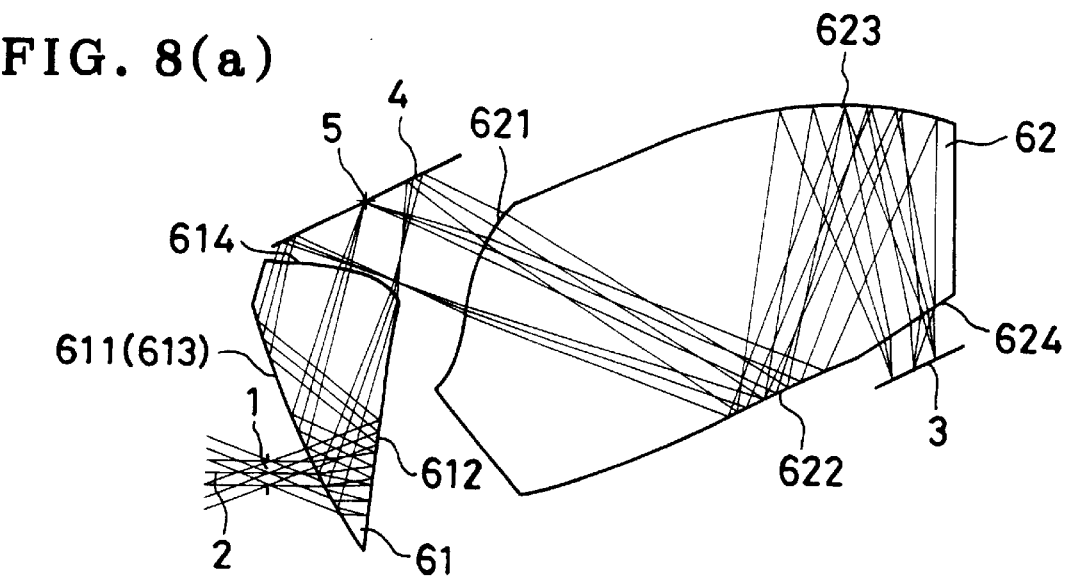
FIG. 8 is a sectional view showing a variable-magnification optical system according to Example 6 at the wide-angle end (a), standard position (b) and telephoto end (c).
Figure 8B:
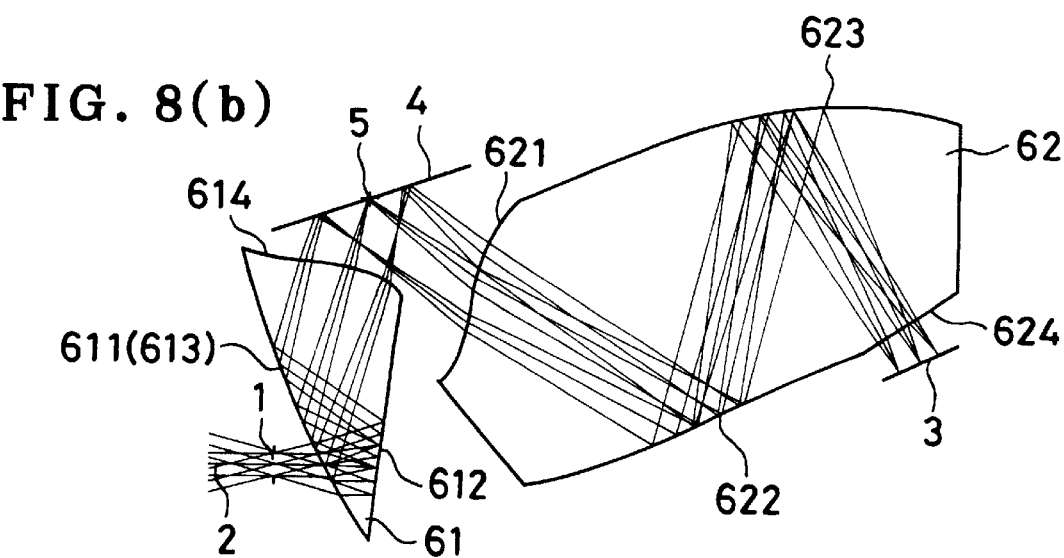
Figure 8C:
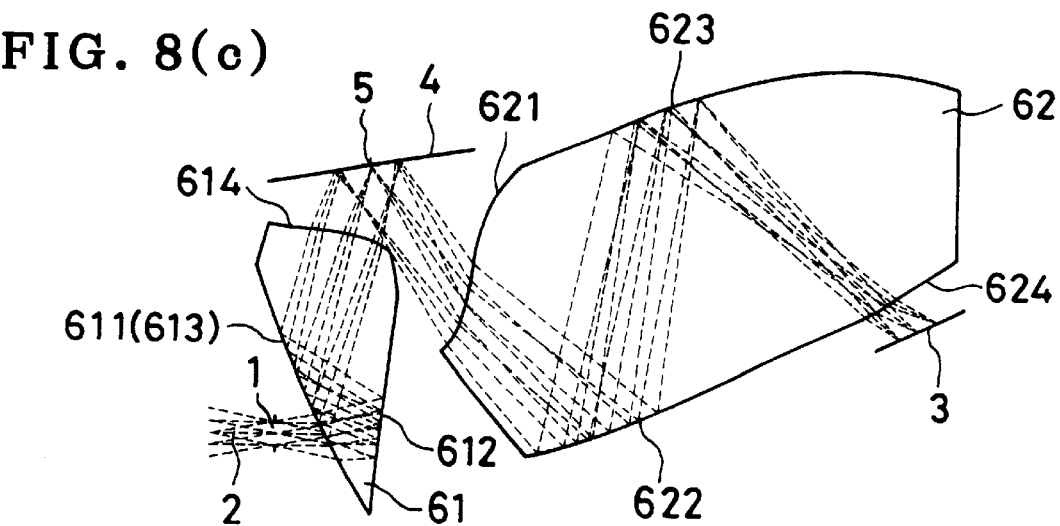

FIG. 8 is a sectional view showing a variable-magnification optical system according to Example 6 at the wide-angle end (a), standard position (b) and telephoto end (c). As shown in FIG. 8, the variable-magnification optical system according to this Example has two optical elements 61 and 62 formed from rotationally asymmetric free-form surfaces. The variable-magnification optical system includes a first unit 61 for forming a first image and a second unit 62 for performing mainly zooming.

A stop 1 is positioned in front of the optical system. The image of the stop 1 is projected within the second unit 62. To move the projected stop image, a rotary reflecting mirror 4 is tilted. That is, the rotary reflecting mirror 4 is positioned in the vicinity of the first image formed by the first unit 61. By tilting the rotary mirror 4, the pupil is moved.

The second unit 62 in this Example is similar to the second unit 52 in Example 5. That is, the second unit 62 is formed from a prism having a Z-shaped optical path. That is, the optical path does not intersect itself within the prism. The first unit 61 is different from the first unit 51 in Example 5. That is, the first unit 61 is formed from a prism having first to fourth surfaces 611 to 614. The first surface 611 is a refracting surface. The second surface 612 is an internally reflecting surface. The third surface 613 is a totally reflecting surface formed by the first surface 611. That is, the first surface 611 also serves as the third surface 613. The fourth surface 614 is a refracting surface. The surfaces 611 to 614 and 621 to 624 are formed from free-form surfaces. The first prism 61 is characterized in that the first surface 611 having a transmitting action also serves as the third surface 613, which performs a reflecting action. That is, the first prism 61 is formed from three surfaces 611, 612 and 614.

EXAMPLE 7

FIG. 9 is a sectional view showing a variable-magnification optical system according to Example 7 at the wide-angle end (a), standard position (b) and telephoto end (c). As shown in FIG. 9, the variable-magnification optical system according to this Example has two optical elements 71 and 72 formed from rotationally asymmetric free-form surfaces. The variable-magnification optical system includes a first unit 71 for forming a first image and a second unit 72 for performing mainly zooming.

A first surface 711 of the first unit 71 also serves as a stop 1. The image of the stop 1 is projected within the second unit 72. To move the projected stop image, a rotary reflecting mirror 4 is tilted. That is, the rotary reflecting mirror 4 is positioned in the vicinity of the first image formed by the first unit 71. By tilting the rotary mirror 4, the pupil is moved.

In this Example, the first unit 71 is formed from a prism having a Z-shaped optical path. That is, the optical path does not intersect itself within the prism. The second unit 72 is formed by using a prism optical system having three reflecting surfaces.

More specifically, the first prism 71 has first to fourth surfaces 711 to 714. The first surface 711 is a refracting surface. The second surface 712 is an internally reflecting surface. The third surface 713 is an internally reflecting surface. The fourth surface 714 is a refracting surface. The surfaces 711 to 714 are formed from free-form surfaces. The second prism 72 has first to fifth surfaces 721 to 725. The first surface 721 is a refracting surface. The second, third and fourth surfaces 722, 723 and 724 are internally reflecting surfaces. The fifth surface 725 is a refracting surface. The surfaces 721 to 725 are formed from free-form surfaces.

In this Example, the reflecting mirror 4 and an image pickup device, which is placed in the image plane 3, can be positioned at the side of the optical system remote from the stop 1 (provided on the first surface 711 of the first prism 71). Thus, it becomes easy to construct an optical apparatus (image pickup apparatus) by integrally providing an image pickup device and a reflecting mirror 4 on a silicon substrate and stacking a layer of a transparent material, e.g. $SiO_2$, thereon [see JP(A) 11-317894].

EXAMPLE 8

Figure 10:
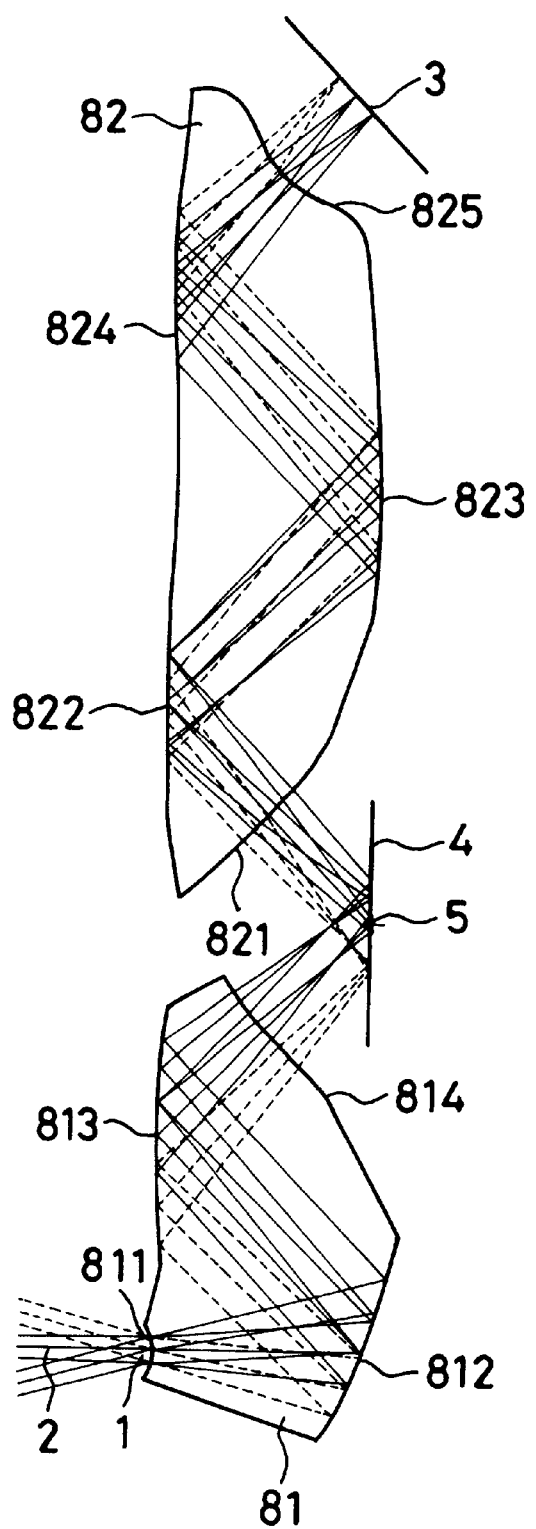
FIG. 10 is a sectional view showing a focusable optical system according to Example 8 as focused at an infinite distance.

FIG. 10 is a sectional view showing a focusable optical system according to Example 8 as focused at an infinite distance. As shown in FIG. 10, the focusable optical system has two optical elements 81 and 82 formed from rotationally asymmetric free-form surfaces. The optical system includes a first unit 81 for forming a first image and a second unit 82 for performing mainly focus adjustment.

This Example has an optical system arrangement similar to that in Example 7. In this Example, focusing is effected by rotation of a reflecting mirror 4.

More specifically, the first unit 81 is formed from a prism having a Z-shaped optical path. That is, the optical path does not intersect itself within the prism. The second unit 82 is formed by using a prism having three reflecting surfaces. The first prism 81 has first to fourth surfaces 811 to 814. The first surface 811 is a refracting surface. The second and third surfaces 812 and 813 are internally reflecting surfaces. The fourth surface 814 is a refracting surface. The surfaces 811 to 814 are formed from free-form surfaces. The second prism 82 has first to fifth surfaces 821 to 825. The first surface 821 is a refracting surface. The second, third and fourth surfaces 822, 823 and 824 are internally reflecting surfaces. The fifth surface 825 is a refracting surface. The surfaces 821 to 825 are formed from free-form surfaces.

This Example can be combined with Example 7 to perform zooming and focusing simultaneously by rotating the reflecting mirror 4 two-dimensionally (another axis of rotation is provided in the plane of FIG. 10).

EXAMPLE 9

Figures 11A, 11B:
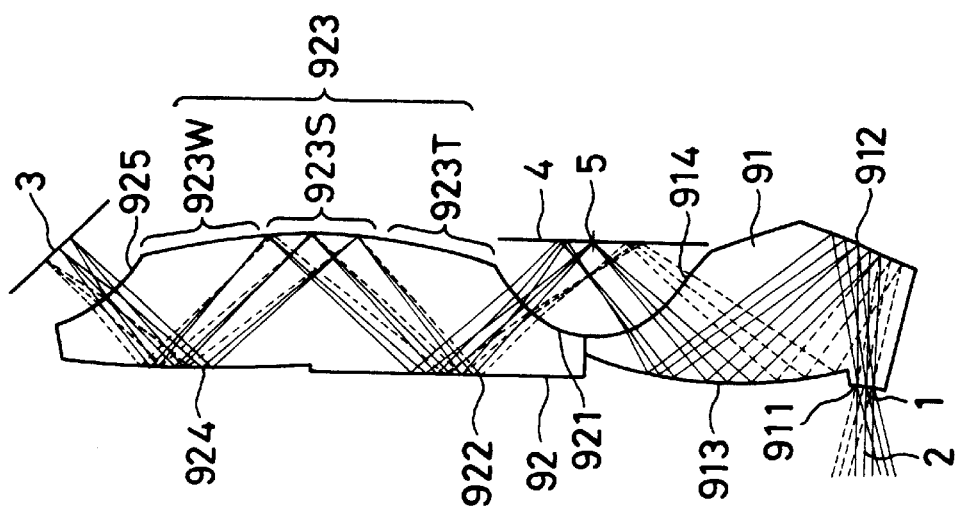
FIG. 11 is a sectional view showing a variable-magnification optical system according to Example 9 at the wide-angle end (a), standard position (b) and telephoto end (c).
Figure 11C:
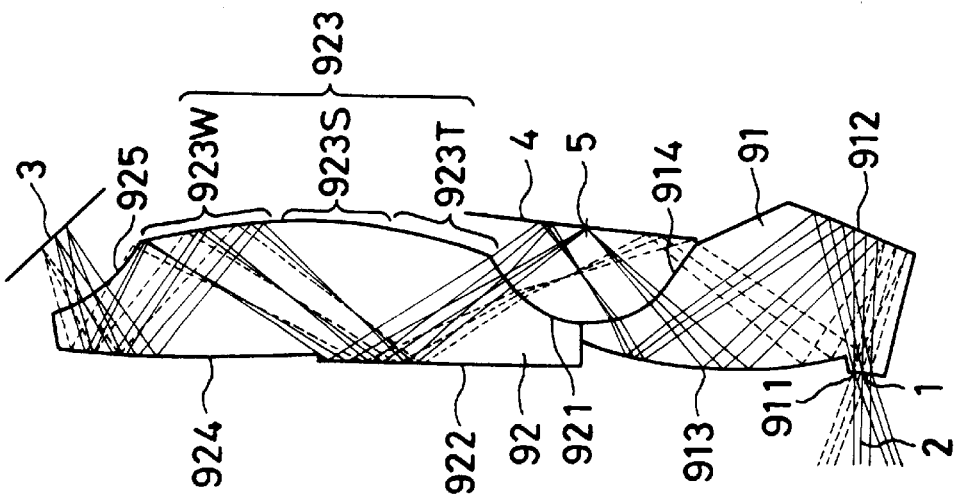
Figure 12A:
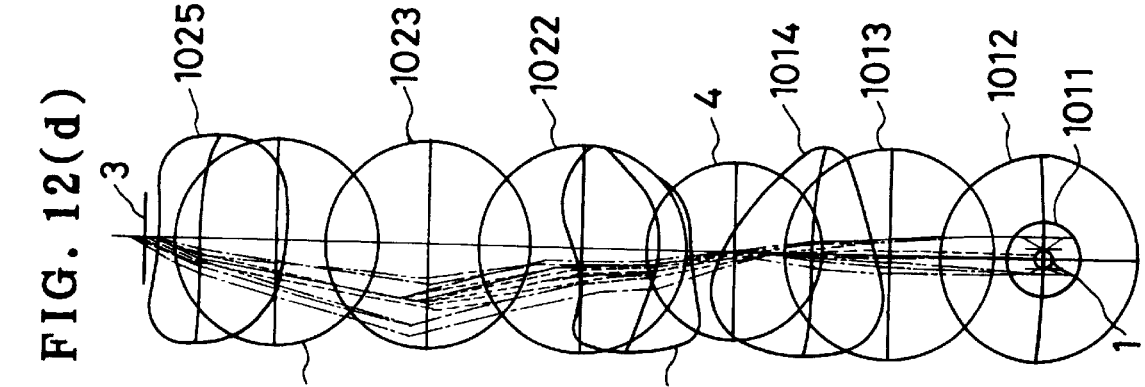
FIG. 12 is a diagram showing a variable-magnification optical system according to Example 10, in which: part (a) is a sectional view showing the optical system at the wide-angle end; part (b) is an optical path projection chart showing the optical system as seen from the front at the wide-angle end; part (c) is an optical path projection chart showing the optical system as seen from the front at the standard position; and part (d) is an optical path projection chart showing the optical system as seen from the front at the telephoto end.
Figure 12B:
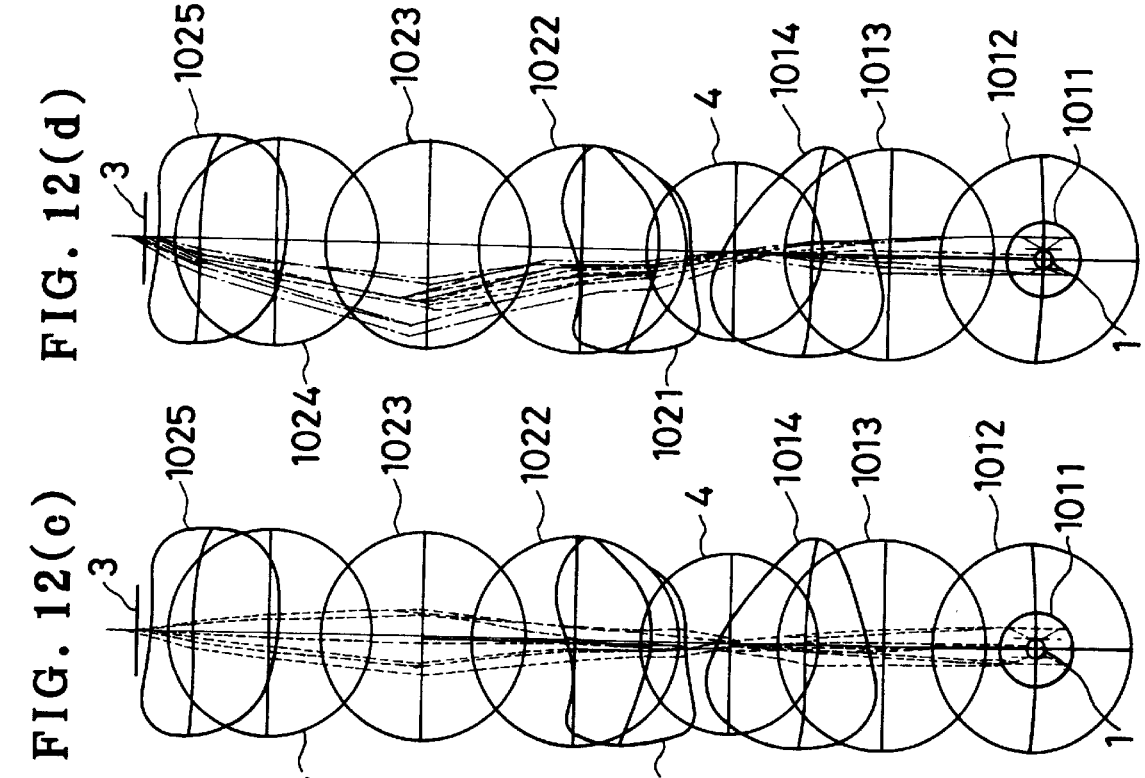
Figure 12C:
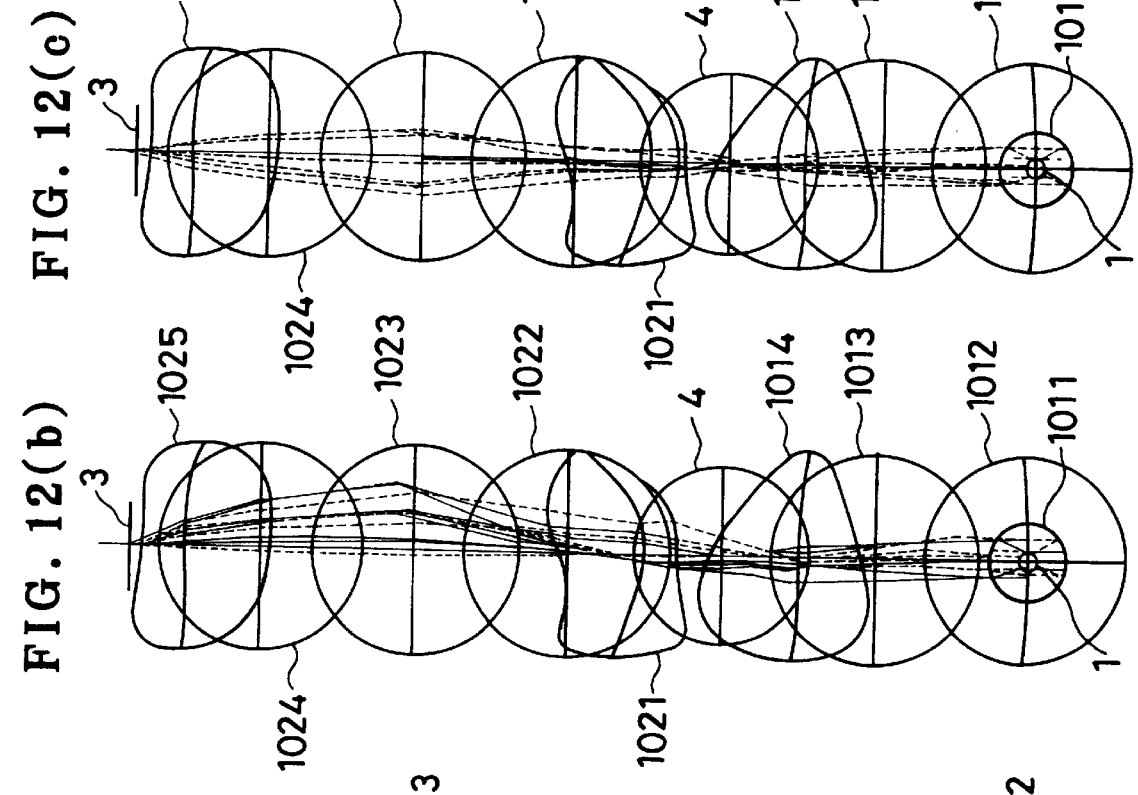
Figure 12D:
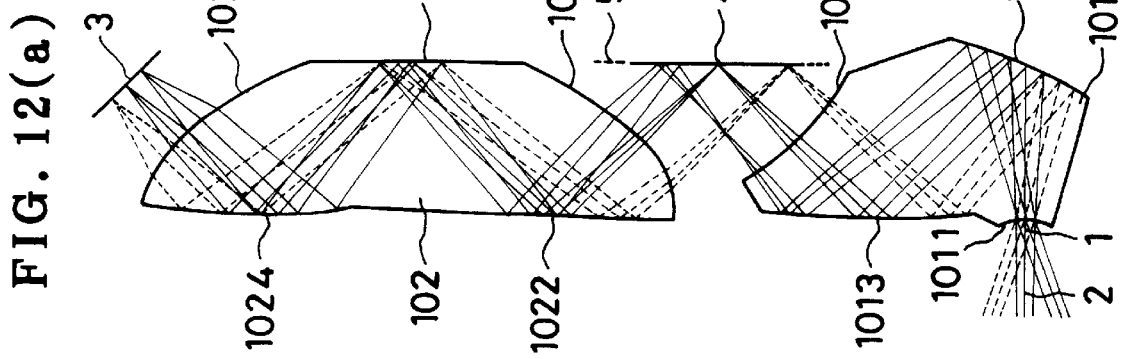

FIG. 11 is a sectional view showing a variable-magnification optical system according to Example 9 at the wide-angle end (a), standard position (b) and telephoto end (c). As shown in FIG. 11, the variable-magnification optical system according to this Example has two optical elements 91 and 92 formed from rotationally asymmetric free-form surfaces. The variable-magnification optical system includes a first unit 91 for forming a first image and a second unit 92 for performing mainly zooming.

This Example is similar in arrangement to Example 7. In this Example, however, the second reflecting surface 923 of the second prism 92 is formed from three discontinuous reflecting surfaces 923W, 923S and 923T. Thus, according to the degree of tilt of the rotary reflecting mirror 4, an optical path is selected so as to be incident on the reflecting surfaces 923W, 923S and 923T in the wide-angle, standard and telephoto positions, respectively. Thus, zooming can be effected in three stages (discontinuous zooming), i.e. WIDE, STANDARD, and TELE. By allowing zooming to be effected discontinuously, the zoom ratio can be increased.

More specifically, the first unit 91 is formed from a prism having a Z-shaped optical path. That is, the optical path does not intersect itself within the prism. The second unit 92 is formed by using a prism having three reflecting surfaces. The first prism 91 has first to fourth surfaces 911 to 914. The first surface 911 is a refracting surface. The second and third surfaces 912 and 913 are internally reflecting surfaces. The fourth surface 914 is a refracting surface. The surfaces 911 to 914 are formed from free-form surfaces. The second prism 92 has first to fifth surfaces 921 to 925. The first surface 921 is a refracting surface. The second surface 922 is an internally reflecting surface. The third surface 923 is an internally reflecting surface formed from discontinuous reflecting surfaces 923W, 923S and 923T as stated above. The fourth surface 924 is an internally reflecting surface. The fifth surface 925 is a refracting surface. The surfaces 921, 922, 923W, 923S, 923T, 924 and 925 are formed from free-form surfaces.

In this Example, the variable-magnification optical system may be combined with another zooming mechanism in which the optical path is changed in a direction perpendicular to the plane of FIG. 11, thereby further increasing the zoom ratio. It is also possible to increase the number of stages in which zooming is effected discontinuously.

EXAMPLE 10

FIG. 12 is a diagram showing a variable-magnification optical system according to Example 10, in which: part (a) is a sectional view showing the optical system at the wide-angle end; part (b) is an optical path projection chart showing the optical system as seen from the front at the wide-angle end; part (c) is an optical path projection chart showing the optical system as seen from the front at the standard position; and part (d) is an optical path projection chart showing the optical system as seen from the front at the telephoto end. As shown in FIG. 12, the variable-magnification optical system according to this Example has two optical elements 101 and 102 formed from rotationally asymmetric free-form surfaces. The variable-magnification optical system includes a first unit 101 for forming a first image and a second unit 102 for performing mainly zooming.

This Example is similar in arrangement to Example 7. In this Example, however, the axis 5 of rotation of the reflecting mirror 4 is placed in the plane of part (a) of FIG. 12, and the reflecting mirror 4 is rotated in a direction perpendicular to the plane of the figure to effect zooming.

More specifically, the first unit 101 is formed from a prism having a Z-shaped optical path. That is, the optical path does not intersect itself within the prism. The second unit 102 is formed by using a prism having three reflecting surfaces. The first prism 101 has first to fourth surfaces 1011 to 1014. The first surface 1011 is a refracting surface. The second and third surfaces 1012 and 1013 are internally reflecting surfaces. The fourth surface 1014 is a refracting surface. The surfaces 1011 to 1014 are formed from free-form surfaces. The second prism 102 has first to fifth surfaces 1021 to 1025. The first surface 1021 is a refracting surface. The second, third and fourth surfaces 1022, 1023 and 1024 are internally reflecting surfaces. The fifth surface 1025 is a refracting surface. The surfaces 1021 to 1025 are formed from free-form surfaces. In this Example, each of the surfaces 1011 to 1014 and 1021 to 1025 needs to have a surface configuration having no plane of symmetry.

EXAMPLE 11

Figure 13A:
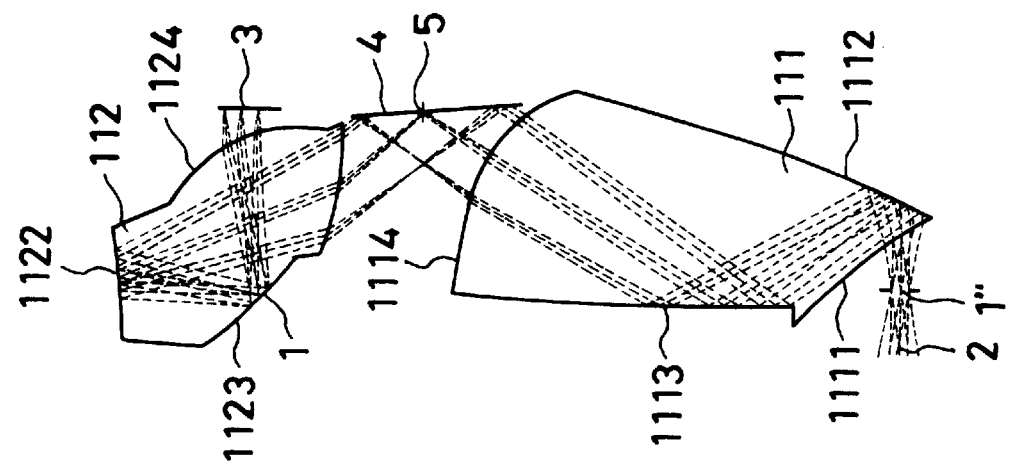
FIG. 13 is a sectional view showing a variable-magnification optical system according to Example 11 at the wide-angle end (a), standard position (b) and telephoto end (c).
Figure 13B:
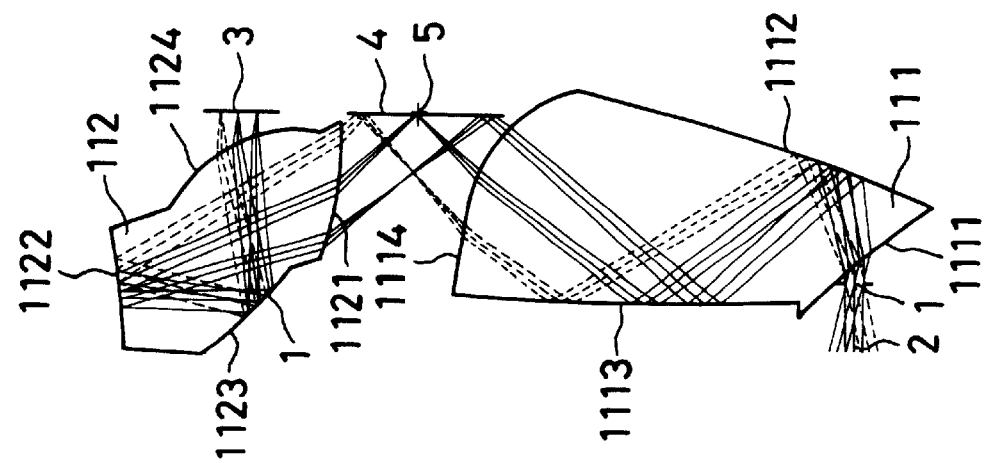
Figure 13C:
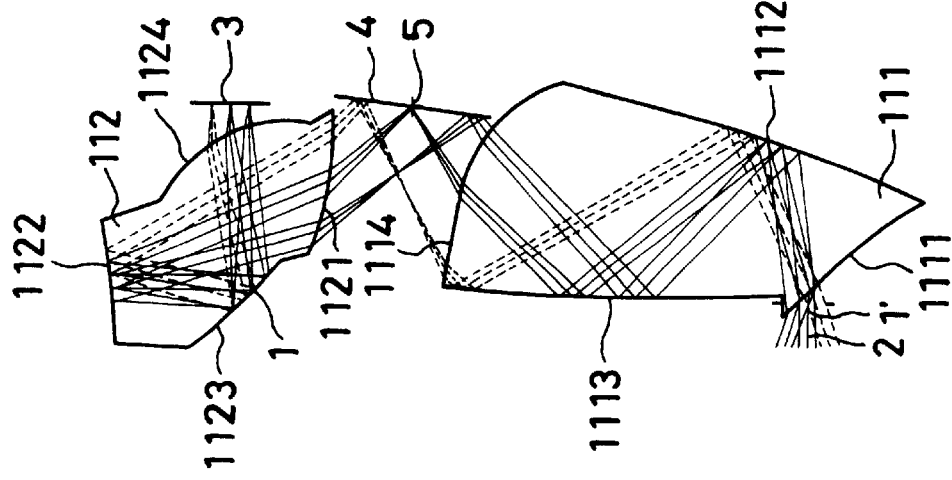

FIG. 13 is a sectional view showing a variable-magnification optical system according to Example 11 at the wide-angle end (a), standard position (b) and telephoto end (c). As shown in FIG. 13, the variable-magnification optical system according to this Example has two optical elements 111 and 112 formed from rotationally asymmetric free-form surfaces. The variable-magnification optical system includes a first unit 111 and a second unit 112. The first unit 111 performs mainly zooming and forms a first image. The second unit 112 has an aperture fixed thereto and forms a fixed exit pupil.

In this Example, the axis 5 of rotation of the reflecting mirror 4 is set in a direction perpendicular to the plane of FIG. 13, and the reflecting mirror 4 is rotated in the plane of the figure to effect zooming. In this case, each of the surfaces 1111 to 1114 and 1121 to 1124 of the prisms 111 and 112 needs to have a surface configuration having a plane of symmetry coincident with the plane of FIG. 13.

In this Example, the first unit 111 is formed from a prism having a Z-shaped optical path. That is, the optical path does not intersect itself within the prism. The first prism 111 has first to fourth surfaces 1111 to 1114. The first surface 1111 is a refracting surface. The second and third surfaces 1112 and 1113 are internally reflecting surfaces. The fourth surface 1114 is a refracting surface. The second unit 112 is formed from a prism arranged so that the optical path intersects itself within the prism. The second prism 112 has first to fourth surfaces 1121 to 1124. The first surface 1121 is a refracting surface. The second and third surfaces 1122 and 1123 are internally reflecting surfaces. The fourth surface 1124 is a refracting surface. The surfaces 1111 to 1114 and 1121 to 1124 are formed from free-form surfaces.

In this Example, a fixed aperture 1 is provided on the third surface 1123 of the second prism 112. The entrance pupil to the first prism 111 moves as shown in the figure, i.e. 1'→1→1". The exit pupil from the first prism 111, which moves in response to zooming, is corrected by the reflecting mirror 4, thereby fixing the entrance pupil position with respect to the second prism 112.

In this Example, the optical path selecting device uses a galvanometer mirror, for example, as the reflecting mirror 4. However, the optical path selecting device can be formed by using any device that can bend or reflect the optical path and select the angle of bending or reflection as desired, for example, a DOE (diffractive optical element), an AOM (acoustic-optical modulator), or a HOE (holographic optical element). A variable-apex angle prism is also usable as an optical path selecting device.

It is also possible to arrange an image pickup device and an optical path selecting device integrally on a substrate of silicon [see JP(A) 11-317894]. Further, an optical element formed from $SiO_2$ can be fabricated on a single substrate.

Constituent parameters in the foregoing Examples 1 to 11 are shown below. In the tables below, "FFS" denotes a free-form surface, and "RE" denotes a reflecting surface. In the "Displacement" column, "W", "S", and "T" added after Y, Z, α, β, etc. denote the wide-angle end, the standard position, and the telephoto end, respectively, and show values of Y, Z, α and β and surface configurations in the respective positions.

EXAMPLE 1

| Surface No. Object plane | Radius of curvature | Surface Displacement separation and tilt | Refractive index | Abbe's No. |
|---|---|---|---|---|
| 1 | ∞ (Stop) | (1) | | |
| 2 | FFS① | (2) | 1.4924 | 57.6 |
| 3 | FFS② | (3) | | |
| 4 | FFS③ | (4) | 1.4924 | 57.6 |
| 5 | FFS④ | (5) | | |
| 6 | FFS⑤ | (6) | 1.4924 | 57.6 |
| 7 | FFS⑥(7) | | | |
| Image plane | ∞ | (8) | | |

FFS①

| | | | | | |
|---|---|---|---|---|---|
| $C_4$ | $6.9763 \times 10^{-2}$ | $C_6$ | $7.0738 \times 10^{-2}$ | $C_8$ | $-1.4579 \times 10^{-3}$ |
| $C_{10}$ | $-1.3384 \times 10^{-3}$ | $C_{11}$ | $-4.8120 \times 10^{-5}$ | $C_{13}$ | $2.3469 \times 10^{-6}$ |

FFS②

| | | | | | |
|---|---|---|---|---|---|
| $C_4$ | $-2.4705 \times 10^{-3}$ | $C_6$ | $-3.0274 \times 10^{-3}$ | $C_8$ | $-3.3515 \times 10^{-5}$ |
| $C_{10}$ | $-7.4037 \times 10^{-4}$ | $C_{11}$ | $-6.1791 \times 10^{-5}$ | $C_{13}$ | $6.7597 \times 10^{-5}$ |

FFS③

| | | | | | |
|---|---|---|---|---|---|
| $C_4$ | $1.0032 \times 10^{-1}$ | $C_6$ | $5.0814 \times 10^{-2}$ | $C_8$ | $-8.2932 \times 10^{-3}$ |
| $C_{10}$ | $3.1329 \times 10^{-3}$ | | | | |

FFS④

| | | | | | |
|---|---|---|---|---|---|
| $C_4$ | $3.2828 \times 10^{-5}$ | $C_6$ | $-3.7727 \times 10^{-2}$ | $C_8$ | $-6.2406 \times 10^{-3}$ |
| $C_{10}$ | $-1.9863 \times 10^{-4}$ | | | | |

FFS⑤

| | | | | | |
|---|---|---|---|---|---|
| $C_4$ | $1.6842 \times 10^{-1}$ | $C_6$ | $1.3127 \times 10^{-1}$ | $C_8$ | $2.7866 \times 10^{-3}$ |
| $C_{10}$ | $1.1877 \times 10^{-3}$ | $C_{11}$ | $1.9463 \times 10^{-3}$ | $C_{13}$ | $3.1862 \times 10^{-3}$ |

FFS⑥

| | | | | | |
|---|---|---|---|---|---|
| $C_4$ | $-1.9454 \times 10^{-2}$ | $C_6$ | $-1.2829 \times 10^{-2}$ | $C_8$ | $-1.9226 \times 10^{-5}$ |
| $C_{10}$ | $3.3786 \times 10^{-3}$ | $C_{11}$ | $4.5133 \times 10^{-3}$ | $C_{13}$ | $4.6130 \times 10^{-3}$ |

Displacement and tilt(1)

| X | 0.00 | Y | 0.00 | Z | 0.00 |
|---|---|---|---|---|---|
| α | 0.00 | β | 0.00 | γ | 0.00 |

Variable power

| YW | −1.37 | YS | 0.00 | YT | 1.46 |
|---|---|---|---|---|---|

Displacement and tilt(2)

| X | 0.00 | Y | 0.00 | Z | 15.38 |
|---|---|---|---|---|---|
| α | 0.00 | β | 0.00 | γ | 0.00 |

Displacement and tilt(3)

| X | 0.00 | Y | 0.00 | Z | 18.73 |
|---|---|---|---|---|---|
| α | 0.00 | β | 0.00 | γ | 0.00 |

Displacement and tilt(4)

| X | 0.00 | Y | 0.00 | Z | 40.00 |
|---|---|---|---|---|---|
| α | −7.81 | β | 0.00 | γ | 0.00 |

Displacement and tilt(5)

| X | 0.00 | Y | 0.00 | Z | 45.00 |
|---|---|---|---|---|---|
| α | −19.27 | β | 0.00 | γ | 0.00 |

Displacement and tilt(6)

| X | 0.00 | Y | 0.00 | Z | 45.92 |
|---|---|---|---|---|---|
| α | −5.39 | β | 0.00 | γ | 0.00 |

-continued

| | | Displacement and tilt(7) | | | |
|---|---|---|---|---|---|
| X | 0.00 | Y | 0.00 | Z | 49.26 |
| α | −1.07 | β | 0.00 | γ | 0.00 |
| | | Displacement and tilt(8) | | | |
| X | 0.00 | Y | 0.56 | Z | 54.24 |
| α | 0.00 | β | 0.00 | γ | 0.00 |
| | | Variable power | | | |
| ZW | 53.17 | ZS | 54.24 | ZT | 55.75 |

EXAMPLE 2

| Surface No. Object plane | Radius of curvature ∞ | Surface Displacement separation and tilt ∞ | Refractive index | Abbe's No. |
|---|---|---|---|---|
| 1 | ∞ (Stop) | (1) | | |
| 2 | FFS① | (2) | 1.4924 | 57.6 |
| 3 | FFS② | (3) | | |
| 4 | ∞ (RE) | (4) | | |
| 5 | FFS③ | (5) | 1.4924 | 57.6 |
| 6 | FFS④ | (6) | | |
| 7 | FFS⑤ | (7) | 1.4924 | 57.6 |
| 8 | FFS⑥ | (8) | | |
| Image plane | ∞ | (9) | | |

FFS①

| $C_4$ | $5.9209 \times 10^{-2}$ | $C_6$ | $5.3177 \times 10^{-2}$ | $C_8$ | $-6.4226 \times 10^{-3}$ |
| $C_{10}$ | $-5.8708 \times 10^{-3}$ | $C_{11}$ | $-7.6519 \times 10^{-5}$ | $C_{13}$ | $7.0242 \times 10^{-4}$ |

FFS②

| $C_4$ | $-3.1345 \times 10^{-2}$ | $C_6$ | $-3.2863 \times 10^{-2}$ | $C_8$ | $2.3696 \times 10^{-4}$ |
| $C_{10}$ | $-4.9922 \times 10^{-3}$ | $C_{11}$ | $6.5377 \times 10^{-5}$ | $C_{13}$ | $9.9807 \times 10^{-4}$ |

FFS③

| $C_4$ | $1.8127 \times 10^{-1}$ | $C_6$ | $1.0379 \times 10^{-1}$ | $C_8$ | $-7.5340 \times 10^{-3}$ |
| $C_{10}$ | $-6.5570 \times 10^{-3}$ | | | | |

FFS④

| $C_4$ | $1.4784 \times 10^{-1}$ | $C_6$ | $-1.4470 \times 10^{-2}$ | $C_8$ | $-6.5292 \times 10^{-4}$ |
| $C_{10}$ | $-2.8406 \times 10^{-3}$ | | | | |

FFS⑤

| $C_4$ | $1.4831 \times 10^{-1}$ | $C_6$ | $6.9016 \times 10^{-2}$ | $C_8$ | $-1.5577 \times 10^{-2}$ |
| $C_{10}$ | $-1.7133 \times 10^{-3}$ | $C_{11}$ | $6.8491 \times 10^{-4}$ | $C_{13}$ | $1.0030 \times 10^{-3}$ |

FFS⑥

| $C_4$ | $-3.0939 \times 10^{-2}$ | $C_6$ | $-4.7516 \times 10^{-2}$ | $C_8$ | $-3.0850 \times 10^{-2}$ |
| $C_{10}$ | $-5.5518 \times 10^{-3}$ | $C_{11}$ | $2.0075 \times 10^{-3}$ | $C_{13}$ | $5.3172 \times 10^{-3}$ |

| | | Displacement and tilt(1) | | | |
|---|---|---|---|---|---|
| X | 0.00 | Y | 0.00 | Z | 0.00 |
| α | 0.00 | β | 0.00 | γ | 0.00 |
| | | Displacement and tilt(2) | | | |
| X | 0.00 | Y | 0.00 | Z | 15.15 |
| α | 0.00 | β | 0.00 | γ | 0.00 |
| | | Displacement and tilt(3) | | | |
| X | 0.00 | Y | 0.00 | Z | 20.70 |
| α | 0.00 | β | 0.00 | γ | 0.00 |
| | | Displacement and tilt(4) | | | |
| X | 0.00 | Y | 0.00 | Z | 30.00 |
| α | −39.29 | β | 0.00 | γ | 0.00 |
| | | Variable power | | | |
| αW | −39.29 | αS | −45.00 | αT | −50.29 |
| | | Displacement and tilt(5) | | | |
| X | 0.00 | Y | 9.78 | Z | 30.00 |
| α | 76.78 | β | 0.00 | γ | 0.00 |
| | | Displacement and tilt(6) | | | |
| X | 0.00 | Y | 14.53 | Z | 30.00 |
| α | 78.08 | β | 0.00 | γ | 0.00 |
| | | Displacement and tilt(7) | | | |
| X | 0.00 | Y | 20.16 | Z | 30.00 |
| α | 51.54 | β | 0.00 | γ | 0.00 |
| | | Displacement and tilt(8) | | | |
| X | 0.00 | Y | 24.76 | Z | 30.00 |
| α | 68.00 | β | 0.00 | γ | 0.00 |
| | | Displacement and tilt(9) | | | |
| X | 0.00 | Y | 29.11 | Z | 31.72 |
| α | 90.00 | β | 0.00 | γ | 0.00 |

EXAMPLE 3

| Surface No. Object plane | Radius of curvature ∞ | Surface Displacement separation and tilt ∞ | Refractive index | Abbe's No. |
|---|---|---|---|---|
| 1 | ∞ (Stop) | (1) | | |
| 2 | FFS① | (2) | 1.4924 | 57.6 |
| 3 | FFS② | (3) | | |
| 4 | ∞ (RE) | (4) | | |
| 5 | FFS③ | (5) | 1.4924 | 57.6 |
| 6 | FFS④ | (6) | 1.4924 | 57.6 |
| 7 | FFS⑤ | (7) | 1.4924 | 57.6 |
| 8 | FFS⑥ | (8) | | |
| Image plane | ∞ | (9) | | |

FFS①

| $C_4$ | $8.4415 \times 10^{-2}$ | $C_6$ | $9.6518 \times 10^{-2}$ | $C_8$ | $-5.8465 \times 10^{-3}$ |
| $C_{10}$ | $-1.5448 \times 10^{-4}$ | $C_{11}$ | $-2.1502 \times 10^{-4}$ | $C_{13}$ | $-1.4826 \times 10^{-5}$ |

FFS②

| $C_4$ | $-4.4064 \times 10^{-2}$ | $C_6$ | $-2.1382 \times 10^{-2}$ | $C_8$ | $-2.2798 \times 10^{-3}$ |
| $C_{10}$ | $1.8454 \times 10^{-3}$ | $C_{11}$ | $-1.5216 \times 10^{-4}$ | $C_{13}$ | $4.9834 \times 10^{-4}$ |

FFS③

| $C_4$ | $-1.3330 \times 10^{-1}$ | $C_6$ | $-7.3889 \times 10^{-2}$ | $C_8$ | $-1.2524 \times 10^{-3}$ |
| $C_{10}$ | $-9.6175 \times 10^{-3}$ | $C_{11}$ | $1.4225 \times 10^{-3}$ | $C_{13}$ | $2.0965 \times 10^{-3}$ |

FFS④

| $C_4$ | $-1.6578 \times 10^{-2}$ | $C_6$ | $-1.3634 \times 10^{-2}$ | $C_8$ | $4.4119 \times 10^{-4}$ |
| $C_{10}$ | $1.2479 \times 10^{-4}$ | $C_{11}$ | $1.3689 \times 10^{-6}$ | $C_{13}$ | $1.2541 \times 10^{-5}$ |

FFS⑤

| $C_4$ | $8.9048 \times 10^{-3}$ | $C_6$ | $7.4252 \times 10^{-3}$ | $C_8$ | $3.8625 \times 10^{-4}$ |
| $C_{10}$ | $-1.0577 \times 10^{-5}$ | $C_{11}$ | $-1.2701 \times 10^{-6}$ | $C_{13}$ | $1.7136 \times 10^{-6}$ |

-continued

FFS⑥

| | | | | | |
|---|---|---|---|---|---|
| $C_4$ | $1.6011 \times 10^{-1}$ | $C_6$ | $5.7598 \times 10^{-2}$ | $C_8$ | $-1.0739 \times 10^{-1}$ |
| $C_{10}$ | $-2.4942 \times 10^{-2}$ | $C_{11}$ | $2.3486 \times 10^{-2}$ | $C_{13}$ | $2.0045 \times 10^{-3}$ |

Displacement and tilt(1)

| X | 0.00 | Y | 0.00 | Z | −18.19 |
|---|---|---|---|---|---|
| α | 0.00 | β | 0.00 | γ | 0.00 |

Displacement and tilt(2)

| X | 0.00 | Y | 0.00 | Z | 0.00 |
|---|---|---|---|---|---|
| α | 0.00 | β | 0.00 | γ | 0.00 |

Displacement and tilt(3)

| X | 0.00 | Y | 0.00 | Z | 5.81 |
|---|---|---|---|---|---|
| α | 0.00 | β | 0.00 | γ | 0.00 |

Displacement and tilt(4)

| X | 0.00 | Y | 0.00 | Z | 11.81 |
|---|---|---|---|---|---|
| α | −45.00 | β | 0.00 | γ | 0.00 |

Variable power

| αW | −35.10 | αS | −45.00 | αT | −54.00 |
|---|---|---|---|---|---|

Displacement and tilt(5)

| X | 0.00 | Y | 5.00 | Z | 11.81 |
|---|---|---|---|---|---|
| α | 90.00 | β | 0.00 | γ | 0.00 |

Displacement and tilt(6)

| X | 0.00 | Y | 20.00 | Z | 11.81 |
|---|---|---|---|---|---|
| α | 67.50 | β | 0.00 | γ | 0.00 |

Displacement and tilt(7)

| X | 0.00 | Y | 10.00 | Z | 1.81 |
|---|---|---|---|---|---|
| α | 22.50 | β | 0.00 | γ | 0.00 |

Displacement and tilt(8)

| X | 0.00 | Y | 10.00 | Z | 21.81 |
|---|---|---|---|---|---|
| α | 0.00 | β | 0.00 | γ | 0.00 |

Displacement and tilt(9)

| X | 0.00 | Y | 10.00 | Z | 23.81 |
|---|---|---|---|---|---|
| α | −180.00 | β | 0.00 | γ | 0.00 |

EXAMPLE 4

| Surface No. Object plane | Radius of curvature ∞ | Surface Displacement separation and tilt ∞ | Refractive index | Abbe's No. |
|---|---|---|---|---|
| 1 | ∞ (Stop) | (1) | | |
| 2 | FFS① | (2) | 1.4924 | 57.6 |
| 3 | FFS②(RE) | (3) | 1.4924 | 57.6 |
| 4 | FFS③(RE) | (4) | 1.4924 | 57.6 |
| 5 | FFS④ | (5) | | |
| Image plane | ∞ | (6) | | |

FFS①

| | | | | | |
|---|---|---|---|---|---|
| $C_4$ | $-7.4251 \times 10^{-2}$ | $C_6$ | $-7.7279 \times 10^{-3}$ | $C_8$ | $3.6916 \times 10^{-3}$ |
| $C_{10}$ | $1.4047 \times 10^{-3}$ | | | | |

-continued

FFS②

| | | | | | |
|---|---|---|---|---|---|
| $C_4$ | $-2.4156 \times 10^{-2}$ | $C_6$ | $-9.5065 \times 10^{-3}$ | $C_8$ | $2.8825 \times 10^{-4}$ |
| $C_{10}$ | $2.0353 \times 10^{-4}$ | | | | |

FFS③

| | | | | | |
|---|---|---|---|---|---|
| $C_4$ | $-8.5758 \times 10^{-3}$ | $C_6$ | $-1.4474 \times 10^{-4}$ | $C_8$ | $-7.2675 \times 10^{-4}$ |
| $C_{10}$ | $3.4379 \times 10^{-4}$ | | | | |

FFS④

| | | | | | |
|---|---|---|---|---|---|
| $C_4$ | $-6.9884 \times 10^{-2}$ | $C_6$ | $-5.5435 \times 10^{-2}$ | $C_8$ | $-3.3869 \times 10^{-3}$ |
| $C_{10}$ | $4.9083 \times 10^{-5}$ | | | | |

Displacement and tilt(1)

| X | 0.00 | Y | 1.05 | Z | −2.00 |
|---|---|---|---|---|---|
| α | 0.00 | β | 0.00 | γ | 0.00 |

Variable power

| YW | 1.05 | YS | −1.33 | YT | −4.28 |
|---|---|---|---|---|---|

Displacement and tilt(2)

| X | 0.00 | Y | 0.00 | Z | 0.00 |
|---|---|---|---|---|---|
| α | 43.03 | β | 0.00 | γ | 0.00 |

Displacement and tilt(3)

| X | 0.00 | Y | 0.36 | Z | 7.60 |
|---|---|---|---|---|---|
| α | −19.18 | β | 0.00 | γ | 0.00 |

Displacement and tilt(4)

| X | 0.00 | Y | 12.53 | Z | −1.51 |
|---|---|---|---|---|---|
| α | 0.26 | β | 0.00 | γ | 0.00 |

Displacement and tilt(5)

| X | 0.00 | Y | 22.24 | Z | 5.63 |
|---|---|---|---|---|---|
| α | 45.03 | β | 0.00 | γ | 0.00 |

Displacement and tilt(6)

| X | 0.00 | Y | 23.97 | Z | 6.72 |
|---|---|---|---|---|---|
| α | 57.97 | β | 0.00 | γ | 0.00 |

EXAMPLE 5

| Surface No. Object plane | Radius of curvature ∞ | Surface Displacement separation and tilt ∞ | Refractive index | Abbe's No. |
|---|---|---|---|---|
| 1 | ∞ (Stop) | (1) | | |
| 2 | FFS① | (2) | 1.4924 | 57.6 |
| 3 | FFS②(RE) | (3) | 1.4924 | 57.6 |
| 4 | FFS③(RE) | (4) | 1.4924 | 57.6 |
| 5 | FFS④ | (5) | | |
| 6 | ∞ (RE) | (6) | | |
| 7 | FFS⑤ | (7) | 1.4924 | 57.6 |
| 8 | FFS⑥(RE) | (8) | 1.4924 | 57.6 |
| 9 | FFS⑦(RE) | (9) | 1.4924 | 57.6 |
| 10 | FFS⑧ | (10) | | |
| Image plane | ∞ | (11) | | |

FFS①

| | | | | | |
|---|---|---|---|---|---|
| $C_4$ | $-8.7293 \times 10^{-2}$ | $C_6$ | $-6.9361 \times 10^{-2}$ | $C_8$ | $2.0873 \times 10^{-2}$ |
| $C_{10}$ | $9.2479 \times 10^{-3}$ | $C_{11}$ | $-1.0181 \times 10^{-2}$ | $C_{13}$ | $-2.1485 \times 10^{-2}$ |

-continued

| | | | | | | |
|---|---|---|---|---|---|---|
| $C_{15}$ | $-2.7858 \times 10^{-3}$ | | | | | |

FFS②

| | | | | | | |
|---|---|---|---|---|---|---|
| $C_4$ | $-1.7878 \times 10^{-2}$ | $C_6$ | $-1.0666 \times 10^{-2}$ | $C_8$ | $6.3036 \times 10^{-4}$ | |
| $C_{10}$ | $7.4740 \times 10^{-4}$ | $C_{11}$ | $-4.7301 \times 10^{-5}$ | $C_{13}$ | $2.1697 \times 10^{-5}$ | |
| $C_{15}$ | $9.4961 \times 10^{-6}$ | | | | | |

FFS③

| | | | | | |
|---|---|---|---|---|---|
| $C_4$ | $5.0185 \times 10^{-3}$ | $C_6$ | $6.6143 \times 10^{-3}$ | $C_8$ | $7.4416 \times 10^{-6}$ |
| $C_{10}$ | $8.7600 \times 10^{-4}$ | $C_{11}$ | $-1.2560 \times 10^{-4}$ | $C_{13}$ | $1.7655 \times 10^{-5}$ |
| $C_{15}$ | $-2.6585 \times 10^{-5}$ | | | | |

FFS④

| | | | | | |
|---|---|---|---|---|---|
| $C_4$ | $4.4531 \times 10^{-3}$ | $C_6$ | $7.7257 \times 10^{-3}$ | $C_8$ | $4.2976 \times 10^{-3}$ |
| $C_{10}$ | $9.2529 \times 10^{-3}$ | $C_{11}$ | $-7.7497 \times 10^{-4}$ | $C_{13}$ | $-4.5967 \times 10^{-4}$ |
| $C_{15}$ | $-1.8819 \times 10^{-5}$ | | | | |

FFS⑤

| | | | | | |
|---|---|---|---|---|---|
| $C_4$ | $7.8401 \times 10^{-2}$ | $C_6$ | $8.1878 \times 10^{-2}$ | $C_8$ | $3.2392 \times 10^{-3}$ |
| $C_{10}$ | $-1.5361 \times 10^{-3}$ | $C_{11}$ | $-2.2878 \times 10^{-4}$ | $C_{13}$ | $-6.7827 \times 10^{-4}$ |
| $C_{15}$ | $1.1952 \times 10^{-4}$ | | | | |

FFS⑥

| | | | | | |
|---|---|---|---|---|---|
| $C_4$ | $3.7871 \times 10^{-3}$ | $C_6$ | $4.5698 \times 10^{-3}$ | $C_8$ | $3.7727 \times 10^{-3}$ |
| $C_{10}$ | $1.6021 \times 10^{-3}$ | $C_{11}$ | $4.5130 \times 10^{-5}$ | $C_{13}$ | $4.6208 \times 10^{-4}$ |
| $C_{15}$ | $1.8860 \times 10^{-4}$ | | | | |

FFS⑦

| | | | | | |
|---|---|---|---|---|---|
| $C_4$ | $2.6293 \times 10^{-2}$ | $C_6$ | $2.4866 \times 10^{-2}$ | $C_8$ | $7.9987 \times 10^{-4}$ |
| $C_{10}$ | $3.1560 \times 10^{-4}$ | $C_{11}$ | $1.7891 \times 10^{-5}$ | $C_{13}$ | $-1.3500 \times 10^{-6}$ |
| $C_{15}$ | $9.1671 \times 10^{-6}$ | | | | |

FFS⑧

| | | | | | |
|---|---|---|---|---|---|
| $C_4$ | $1.2716 \times 10^{-1}$ | $C_6$ | $1.5490 \times 10^{-2}$ | $C_8$ | $-2.2819 \times 10^{-2}$ |
| $C_{11}$ | $-3.8749 \times 10^{-3}$ | $C_{13}$ | $-5.9841 \times 10^{-3}$ | $C_{15}$ | $-7.1686 \times 10^{-4}$ |

| Displacement and tilt(1) | | | | | |
|---|---|---|---|---|---|
| X | 0.00 | Y | 0.00 | Z | 0.00 |
| α | 0.00 | β | 0.00 | γ | 0.00 |
| Displacement and tilt(2) | | | | | |
| X | 0.00 | Y | 0.00 | Z | 0.86 |
| α | -7.07 | β | 0.00 | γ | 0.00 |
| Displacement and tilt(3) | | | | | |
| X | 0.00 | Y | -0.57 | Z | 14.70 |
| α | 20.36 | β | 0.00 | γ | 0.00 |
| Displacement and tilt(4) | | | | | |
| X | 0.00 | Y | -6.86 | Z | 7.97 |
| α | 66.53 | β | 0.00 | γ | 0.00 |
| Displacement and tilt(5) | | | | | |
| X | 0.00 | Y | 5.21 | Z | 7.97 |
| α | 90.00 | β | 0.00 | γ | 0.00 |
| Displacement and tilt(6) | | | | | |
| X | 0.00 | Y | 10.77 | Z | 7.97 |
| α | 129.72 | β | 0.00 | γ | 0.00 |
| Variable power | | | | | |
| αW | 129.72 | αS | 125.00 | αT | 118.52 |
| Displacement and tilt(7) | | | | | |
| X | 0.00 | Y | 8.87 | Z | 13.17 |
| α | -36.08 | β | 0.00 | γ | 0.00 |
| Displacement and tilt(8) | | | | | |
| X | 0.00 | Y | 3.83 | Z | 23.79 |
| α | -51.13 | β | 0.00 | γ | 0.00 |
| Displacement and tilt(9) | | | | | |
| X | 0.00 | Y | 24.31 | Z | 19.02 |

-continued

| | | | | | | |
|---|---|---|---|---|---|---|
| α | -60.26 | β | 0.00 | γ | 0.00 | |
| Displacement and tilt(10) | | | | | | |
| X | 0.00 | Y | 17.52 | Z | 26.13 | |
| α | -41.26 | β | 0.00 | γ | 0.00 | |
| Displacement and tilt(11) | | | | | | |
| X | 0.00 | Y | 16.11 | Z | 27.55 | |
| α | -44.84 | β | 0.00 | γ | 0.00 | |

EXAMPLE 6

| Surface No. | Radius of curvature | Surface separation and tilt | Refractive index | Abbe's No. |
|---|---|---|---|---|
| Object plane | ∞ | ∞ | | |
| 1 | ∞ (Stop) | (1) | | |
| 2 | FFS① | (2) | 1.4924 | 57.6 |
| 3 | FFS② (RE) | (3) | 1.4924 | 57.6 |
| 4 | FFS① (RE) | (2) | 1.4924 | 57.6 |
| 5 | FFS③ | (4) | | |
| 6 | ∞ (RE) | (5) | | |
| 7 | FFS④ | (6) | 1.4924 | 57.6 |
| 8 | FFS⑤ (RE) | (7) | 1.4924 | 57.6 |
| 9 | FFS⑥ (RE) | (8) | 1.4924 | 57.6 |
| 10 | FFS⑦ | (9) | | |
| Image plane | ∞ | (10) | | |

FFS①

| | | | | | |
|---|---|---|---|---|---|
| $C_4$ | $-2.0502 \times 10^{-2}$ | $C_6$ | $1.0674 \times 10^{-2}$ | $C_8$ | $1.8593 \times 10^{-3}$ |
| $C_{10}$ | $-1.1123 \times 10^{-4}$ | | | | |

FFS②

| | | | | | |
|---|---|---|---|---|---|
| $C_4$ | $-2.4681 \times 10^{-2}$ | $C_6$ | $1.6989 \times 10^{-3}$ | $C_8$ | $5.0453 \times 10^{-3}$ |
| $C_{10}$ | $-3.9626 \times 10^{-4}$ | | | | |

FFS③

| | | | | | |
|---|---|---|---|---|---|
| $C_4$ | $-1.2402 \times 10^{-2}$ | $C_6$ | $-5.4383 \times 10^{-2}$ | $C_8$ | $1.5800 \times 10^{-3}$ |
| $C_{10}$ | $8.2192 \times 10^{-3}$ | | | | |

FFS④

| | | | | | |
|---|---|---|---|---|---|
| $C_4$ | $8.8853 \times 10^{-2}$ | $C_6$ | $3.1110 \times 10^{-2}$ | $C_8$ | $6.5297 \times 10^{-3}$ |
| $C_{10}$ | $8.6293 \times 10^{-3}$ | | | | |

FFS⑤

| | | | | | |
|---|---|---|---|---|---|
| $C_4$ | $1.0810 \times 10^{-2}$ | $C_6$ | $-2.0778 \times 10^{-3}$ | $C_8$ | $8.9404 \times 10^{-4}$ |
| $C_{10}$ | $4.7807 \times 10^{-4}$ | | | | |

FFS⑥

| | | | | | |
|---|---|---|---|---|---|
| $C_4$ | $2.5840 \times 10^{-2}$ | $C_6$ | $1.9622 \times 10^{-2}$ | $C_8$ | $4.7071 \times 10^{-4}$ |
| $C_{10}$ | $3.6466 \times 10^{-4}$ | | | | |

FFS⑦

| | | | | | |
|---|---|---|---|---|---|
| $C_4$ | $-1.2053 \times 10^{-2}$ | $C_6$ | $3.8084 \times 10^{-3}$ | $C_8$ | $1.3860 \times 10^{-3}$ |

| Displacement and tilt(1) | | | | | |
|---|---|---|---|---|---|
| X | 0.00 | Y | 0.00 | Z | 0.00 |
| α | 0.00 | β | 0.00 | γ | 0.00 |
| Displacement and tilt(2) | | | | | |
| X | 0.00 | Y | 2.14 | Z | 1.39 |

-continued

|   |   |   |   |   |   |
|---|---|---|---|---|---|
| α | 25.99 | β | 0.00 | γ | 0.00 |

Displacement and tilt(3)

| X | 0.00 | Y | 0.49 | Z | 5.24 |
|---|---|---|---|---|---|
| α | −6.59 | β | 0.00 | γ | 0.00 |

Displacement and tilt(4)

| X | 0.00 | Y | 9.99 | Z | 3.45 |
|---|---|---|---|---|---|
| α | 78.96 | β | 0.00 | γ | 0.00 |

Displacement and tilt(5)

| X | 0.00 | Y | 13.43 | Z | 4.48 |
|---|---|---|---|---|---|
| α | 116.98 | β | 0.00 | γ | 0.00 |

Variable power

| αW | 116.98 | αS | 109.37 | αT | 100.00 |
|---|---|---|---|---|---|

Displacement and tilt(6)

| X | 0.00 | Y | 9.63 | Z | 9.98 |
|---|---|---|---|---|---|
| α | −11.65 | β | 0.00 | γ | 0.00 |

Displacement and tilt(7)

| X | 0.00 | Y | 3.17 | Z | 22.75 |
|---|---|---|---|---|---|
| α | −64.32 | β | 0.00 | γ | 0.00 |

Displacement and tilt(8)

| X | 0.00 | Y | 18.44 | Z | 25.94 |
|---|---|---|---|---|---|
| α | −81.56 | β | 0.00 | γ | 0.00 |

Displacement and tilt(9)

| X | 0.00 | Y | 7.84 | Z | 31.75 |
|---|---|---|---|---|---|
| α | −56.16 | β | 0.00 | γ | 0.00 |

Displacement and tilt(10)

| X | 0.00 | Y | 6.04 | Z | 32.63 |
|---|---|---|---|---|---|
| α | −63.87 | β | 0.00 | γ | 0.00 |

EXAMPLE 7

| Surface No. Object plane | Radius of curvature ∞ | Surface separation and tilt ∞ | Refractive index | Abbe's No. |
|---|---|---|---|---|
| 1 | ∞ (Stop) | (1) | | |
| 2 | FFS① | (1) | 1.4924 | 57.6 |
| 3 | FFS② (RE) | (2) | 1.4924 | 57.6 |
| 4 | FFS③ (RE) | (3) | 1.4924 | 57.6 |
| 5 | FFS④ | (4) | | |
| 6 | ∞ (RE) | (5) | | |
| 7 | FFS⑤ | (6) | 1.4924 | 57.6 |
| 8 | FFS⑥ (RE) | (7) | 1.4924 | 57.6 |
| 9 | FFS⑦ (RE) | (8) | 1.4924 | 57.6 |
| 10 | FFS⑧ (RE) | (9) | | |
| 11 | FFS⑨ | (10) | | |
| Image plane | ∞ | (11) | | |

FFS①

| $C_4$ | $-7.5849 \times 10^{-2}$ | $C_6$ | $-2.1001 \times 10^{-1}$ | $C_8$ | $1.8595 \times 10^{-2}$ |
|---|---|---|---|---|---|
| $C_{11}$ | $-3.2713 \times 10^{-3}$ | $C_{13}$ | $1.8979 \times 10^{-3}$ | $C_{15}$ | $-2.7954 \times 10^{-3}$ |

FFS②

| $C_4$ | $-2.6586 \times 10^{-2}$ | $C_6$ | $-1.4637 \times 10^{-2}$ | $C_8$ | $2.8153 \times 10^{-4}$ |
|---|---|---|---|---|---|
| $C_{10}$ | $-1.4507 \times 10^{-5}$ | $C_{11}$ | $5.2539 \times 10^{-5}$ | $C_{13}$ | $-1.3197 \times 10^{-5}$ |
| $C_{15}$ | $4.7643 \times 10^{-6}$ | | | | |

FFS③

| $C_4$ | $-5.1519 \times 10^{-2}$ | $C_6$ | $9.8744 \times 10^{-3}$ | $C_8$ | $5.8213 \times 10^{-4}$ |
|---|---|---|---|---|---|
| $C_{10}$ | $2.5081 \times 10^{-4}$ | $C_{11}$ | $2.4138 \times 10^{-4}$ | $C_{13}$ | $2.7917 \times 10^{-5}$ |
| $C_{15}$ | $3.1553 \times 10^{-6}$ | | | | |

FFS④

| $C_4$ | $-1.2871 \times 10^{-1}$ | $C_6$ | $-1.6332 \times 10^{-2}$ | $C_8$ | $-1.6372 \times 10^{-2}$ |
|---|---|---|---|---|---|
| $C_{10}$ | $4.1590 \times 10^{-3}$ | $C_{11}$ | $-4.0020 \times 10^{-4}$ | $C_{13}$ | $-6.5318 \times 10^{-4}$ |
| $C_{15}$ | $-3.1471 \times 10^{-4}$ | | | | |

FFS⑤D

| $C_4$ | $-3.1069 \times 10^{-2}$ | $C_6$ | $9.0969 \times 10^{-3}$ | $C_8$ | $6.2273 \times 10^{-3}$ |
|---|---|---|---|---|---|
| $C_{10}$ | $-5.2560 \times 10^{-3}$ | $C_{11}$ | $-2.4004 \times 10^{-4}$ | $C_{13}$ | $-1.3765 \times 10^{-4}$ |
| $C_{15}$ | $2.7977 \times 10^{-5}$ | | | | |

FFS⑥

| $C_4$ | $-2.4548 \times 10^{-3}$ | $C_6$ | $5.7651 \times 10^{-3}$ | $C_8$ | $1.1599 \times 10^{-3}$ |
|---|---|---|---|---|---|
| $C_{10}$ | $-3.4716 \times 10^{-4}$ | $C_{11}$ | $-1.2910 \times 10^{-4}$ | $C_{13}$ | $1.6712 \times 10^{-5}$ |
| $C_{15}$ | $5.5415 \times 10^{-6}$ | | | | |

FFS⑦

| $C_4$ | $-1.5760 \times 10^{-2}$ | $C_6$ | $-7.8317 \times 10^{-3}$ | $C_8$ | $3.1211 \times 10^{-5}$ |
|---|---|---|---|---|---|
| $C_{10}$ | $-1.3084 \times 10^{-4}$ | $C_{11}$ | $-2.9966 \times 10^{-5}$ | $C_{13}$ | $1.3067 \times 10^{-5}$ |
| $C_{15}$ | $-1.1688 \times 10^{-6}$ | | | | |

FFS⑧

| $C_4$ | $8.4121 \times 10^{-3}$ | $C_6$ | $9.9052 \times 10^{-3}$ | $C_8$ | $-7.8434 \times 10^{-4}$ |
|---|---|---|---|---|---|
| $C_{10}$ | $1.3538 \times 10^{-4}$ | $C_{11}$ | $-4.1564 \times 10^{-4}$ | $C_{13}$ | $-4.9781 \times 10^{-5}$ |
| $C_{15}$ | $1.3947 \times 10^{-6}$ | | | | |

FFS⑨

| $C_4$ | $-9.6675 \times 10^{-2}$ | $C_6$ | $1.0243 \times 10^{-1}$ | $C_8$ | $-3.1351 \times 10^{-2}$ |
|---|---|---|---|---|---|
| $C_{10}$ | $-1.0200 \times 10^{-2}$ | $C_{11}$ | $-5.0995 \times 10^{-3}$ | $C_{13}$ | $-9.8442 \times 10^{-3}$ |
| $C_{15}$ | $5.0463 \times 10^{-4}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 10.00 |
|---|---|---|---|---|---|
| α | −22.50 | β | 0.00 | γ | 0.00 |

Displacement and tilt(3)

| X | 0.00 | Y | 10.00 | Z | 0.00 |
|---|---|---|---|---|---|
| α | 0.00 | β | 0.00 | γ | 0.00 |

Displacement and tilt(4)

| X | 0.00 | Y | 15.00 | Z | 5.00 |
|---|---|---|---|---|---|
| α | 45.00 | β | 0.00 | γ | 0.00 |

Displacement and tilt(5)

| X | 0.00 | Y | 20.00 | Z | 10.00 |
|---|---|---|---|---|---|
| α | −7.90 | β | 0.00 | γ | 0.00 |

Variable power

| αW | −7.90 | αS | 0.00 | αT | 9.30 |
|---|---|---|---|---|---|

Displacement and tilt(6)

| X | 0.00 | Y | 25.00 | Z | 5.00 |
|---|---|---|---|---|---|
| α | −45.00 | β | 0.00 | γ | 0.00 |

Displacement and tilt(7)

| X | 0.00 | Y | 30.00 | Z | 0.00 |
|---|---|---|---|---|---|
| α | 0.00 | β | 0.00 | γ | 0.00 |

Displacement and tilt(8)

| X | 0.00 | Y | 40.00 | Z | 10.00 |
|---|---|---|---|---|---|
| α | 0.00 | β | 0.00 | γ | 0.00 |

Displacement and tilt(9)

| X | 0.00 | Y | 50.00 | Z | 0.00 |
|---|---|---|---|---|---|
| α | 0.00 | β | 0.00 | γ | 0.00 |

-continued

| | | Displacement and tilt(10) | | | |
|---|---|---|---|---|---|
| X | 0.00 | Y | 55.00 | Z | 5.00 |
| α | 45.00 | β | 0.00 | γ | 0.00 |
| | | Displacement and tilt(11) | | | |
| X | 0.00 | Y | 57.12 | Z | 7.12 |
| α | 45.00 | β | 0.00 | γ | 0.00 |

EXAMPLE 8

| Surface No. Object plane | Radius of curvature | Surface separation | Displacement and tilt | Refractive index | Abbe's No. |
|---|---|---|---|---|---|
| Object plane | ∞ | ∞ | | | |
| 1 | ∞ (Stop) | | (1) | | |
| 2 | FFS① | | (1) | 1.4924 | 57.6 |
| 3 | FFS② (RE) | | (2) | 1.4924 | 57.6 |
| 4 | FFS③ (RE) | | (3) | 1.4924 | 57.6 |
| 5 | FFS④ | | (4) | | |
| 6 | ∞ (RE) | | (5) | | |
| 7 | FFS⑤ | | (6) | 1.4924 | 57.6 |
| 8 | FFS⑥ (RE) | | (7) | 1.4924 | 57.6 |
| 9 | FFS⑦ (RE) | | (8) | 1.4924 | 57.6 |
| 10 | FFS⑧ (RE) | | (9) | 1.4924 | 57.6 |
| 11 | FFS⑨ | | (10) | | |
| 12 | ∞ | | (10) | | |
| Image plane | ∞ | | (11) | | |

FFS①
$C_4$ $-9.2076 \times 10^{-2}$ $C_6$ $-2.3071 \times 10^{-1}$ $C_8$ $3.6581 \times 10^{-2}$
$C_{11}$ $-2.1248 \times 10^{-3}$ $C_{13}$ $-1.1490 \times 10^{-2}$ $C_{15}$ $-3.8810 \times 10^{-3}$ FFS②
$C_4$ $-2.4338 \times 10^{-2}$ $C_6$ $-1.7238 \times 10^{-2}$ $C_8$ $2.4170 \times 10^{-4}$
$C_{10}$ $-3.7608 \times 10^{-5}$ $C_{11}$ $-5.5767 \times 10^{-5}$ $C_{13}$ $-4.0763 \times 10^{-5}$
$C_{15}$ $-3.3564 \times 10^{-6}$ FFS③
$C_4$ $-1.8608 \times 10^{-2}$ $C_6$ $9.6349 \times 10^{-3}$ $C_8$ $4.1704 \times 10^{-4}$
$C_{10}$ $1.5959 \times 10^{-4}$ $C_{11}$ $-9.6747 \times 10^{-5}$ $C_{13}$ $-2.1590 \times 10^{-5}$
$C_{15}$ $-7.4261 \times 10^{-6}$ FFS④
$C_4$ $-7.7128 \times 10^{-2}$ $C_6$ $2.7480 \times 10^{-2}$ $C_8$ $-5.5612 \times 10^{-3}$
$C_{10}$ $4.5222 \times 10^{-3}$ $C_{11}$ $3.5222 \times 10^{-5}$ $C_{13}$ $-2.5584 \times 10^{-4}$
$C_{15}$ $-4.0726 \times 10^{-4}$ FFS⑤
$C_4$ $-4.4476 \times 10^{-2}$ $C_6$ $-1.3062 \times 10^{-3}$ $C_8$ $4.7688 \times 10^{-3}$
$C_{10}$ $-2.7422 \times 10^{-3}$ $C_{11}$ $-2.2920 \times 10^{-4}$ $C_{13}$ $-5.7401 \times 10^{-4}$
$C_{15}$ $-5.5526 \times 10^{-4}$ FFS⑥
$C_4$ $-5.9099 \times 10^{-3}$ $C_6$ $3.9073 \times 10^{-3}$ $C_8$ $9.8864 \times 10^{-4}$
$C_{10}$ $-4.6761 \times 10^{-5}$ $C_{11}$ $-1.1775 \times 10^{-4}$ $C_{13}$ $-3.6585 \times 10^{-5}$
$C_{15}$ $3.8892 \times 10^{-6}$ FFS⑦
$C_4$ $-1.4984 \times 10^{-2}$ $C_6$ $-6.9285 \times 10^{-3}$ $C_8$ $-2.4790 \times 10^{-4}$
$C_{10}$ $-5.4528 \times 10^{-5}$ $C_{11}$ $-4.8989 \times 10^{-5}$ $C_{13}$ $-3.8048 \times 10^{-5}$
$C_{15}$ $4.4491 \times 10^{-6}$ FFS⑧
$C_4$ $7.6388 \times 10^{-3}$ $C_6$ $9.9170 \times 10^{-3}$ $C_8$ $-8.4452 \times 10^{-4}$
$C_{10}$ $1.3315 \times 10^{-4}$ $C_{11}$ $-1.4604 \times 10^{-4}$ $C_{13}$ $-1.8583 \times 10^{-5}$
$C_{15}$ $-1.5332 \times 10^{-6}$ FFS⑨
$C_4$ $-9.0408 \times 10^{-2}$ $C_6$ $1.0840 \times 10^{-1}$ $C_8$ $-1.3160 \times 10^{-2}$
$C_{10}$ $-2.4614 \times 10^{-3}$ $C_{11}$ $1.2426 \times 10^{-3}$ $C_{13}$ $-3.3626 \times 10^{-5}$
$C_{15}$ $-3.4031 \times 10^{-3}$

| | | Displacement and tilt(1) | | | |
|---|---|---|---|---|---|
| X | 0.00 | Y | 0.00 | Z | 0.00 |
| α | 0.00 | β | 0.00 | γ | 0.00 |
| | | Displacement and tilt(2) | | | |
| X | 0.00 | Y | 0.00 | Z | 10.00 |
| α | −22.50 | β | 0.00 | γ | 0.00 |
| | | Displacement and tilt(3) | | | |
| X | 0.00 | Y | 10.00 | Z | 0.00 |
| α | 0.00 | β | 0.00 | γ | 0.00 |
| | | Displacement and tilt(4) | | | |
| X | 0.00 | Y | 15.00 | Z | 5.00 |
| α | 45.00 | β | 0.00 | γ | 0.00 |
| | | Displacement and tilt(5) | | | |
| X | 0.00 | Y | 20.00 | Z | 10.00 |
| α | 0.00 | β | 0.00 | γ | 0.00 |
| | | Focusing | | | |
| α ∞ | 0.00 | α 2D | −0.31 | α 4D | −1.40 |
| | | Displacement and tilt(6) | | | |
| X | 0.00 | Y | 25.00 | Z | 5.00 |
| α | −45.00 | β | 0.00 | γ | 0.00 |
| | | Displacement and tilt(7) | | | |
| X | 0.00 | Y | 30.00 | Z | 0.00 |
| α | 0.00 | β | 0.00 | γ | 0.00 |
| | | Displacement and tilt(8) | | | |
| X | 0.00 | Y | 40.00 | Z | 10.00 |
| α | 0.00 | β | 0.00 | γ | 0.00 |
| | | Displacement and tilt(9) | | | |
| X | 0.00 | Y | 50.00 | Z | 0.00 |
| α | 0.00 | β | 0.00 | γ | 0.00 |
| | | Displacement and tilt(10) | | | |
| X | 0.00 | Y | 55.00 | Z | 5.00 |
| α | 45.00 | β | 0.00 | γ | 0.00 |
| | | Displacement and tilt(11) | | | |
| X | 0.00 | Y | 58.54 | Z | 8.54 |
| α | 45.00 | β | 0.00 | γ | 0.00 |

EXAMPLE 9

| Surface No. Object plane | Radius of curvature | Surface separation | Displacement and tilt | Refractive index | Abbe's No. |
|---|---|---|---|---|---|
| Object plane | ∞ | ∞ | | | |
| 1 | ∞ (Stop) | | (1) | | |
| 2 | FFS① | | (1) | 1.4924 | 57.6 |
| 3 | FFS② (RE) | | (2) | 1.4924 | 57.6 |
| 4 | FFS③ (RE) | | (3) | 1.4924 | 57.6 |
| 5 | FFS④ | | (4) | | |
| 6 | ∞ (RE) | | (5) | | |
| 7 | FFS⑤ | | (6) | 1.4924 | 57.6 |
| 8 | FFS⑥ (RE) | | (7) | 1.4924 | 57.6 |
| 9 | FFS⑦ (RE) | | (8) | 1.4924 | 57.6 |

-continued

| Surface No. Object plane | Radius of curvature | Surface separation | Displacement and tilt | Refractive index | Abbe's No. |
|---|---|---|---|---|---|
| 10 | FFS⑧ (RE) | | (9) | 1.4924 | 57.6 |
| 11 | FFS⑨ | | (10) | | |
| Image plane | ∞ | | (11) | | |

FFS①

| | | | | | |
|---|---|---|---|---|---|
| $C_4$ | $-6.7836 \times 10^{-2}$ | $C_6$ | $-7.4174 \times 10^{-2}$ | $C_8$ | $4.4488 \times 10^{-2}$ |
| $C_{11}$ | $-7.8246 \times 10^{-3}$ | $C_{13}$ | $3.9831 \times 10^{-3}$ | $C_{15}$ | $1.7514 \times 10^{-3}$ |

FFS②

| | | | | | |
|---|---|---|---|---|---|
| $C_4$ | $-2.0230 \times 10^{-2}$ | $C_6$ | $-1.8727 \times 10^{-3}$ | $C_8$ | $6.3095 \times 10^{-4}$ |
| $C_{10}$ | $-1.8532 \times 10^{-3}$ | $C_{11}$ | $-2.5615 \times 10^{-5}$ | $C_{13}$ | $-5.9976 \times 10^{-5}$ |
| $C_{15}$ | $1.1328 \times 10^{-4}$ | | | | |

FFS③

| | | | | | |
|---|---|---|---|---|---|
| $C_4$ | $-1.1272 \times 10^{-2}$ | $C_6$ | $1.5453 \times 10^{-2}$ | $C_8$ | $6.1037 \times 10^{-4}$ |
| $C_{10}$ | $7.6123 \times 10^{-5}$ | $C_{11}$ | $-7.1033 \times 10^{-5}$ | $C_{13}$ | $1.6330 \times 10^{-5}$ |
| $C_{15}$ | $6.5167 \times 10^{-6}$ | | | | |

FFS④

| | | | | | |
|---|---|---|---|---|---|
| $C_4$ | $-5.0117 \times 10^{-2}$ | $C_6$ | $6.2408 \times 10^{-2}$ | $C_8$ | $-2.2351 \times 10^{-3}$ |
| $C_{10}$ | $6.5359 \times 10^{-3}$ | $C_{11}$ | $-1.3555 \times 10^{-4}$ | $C_{13}$ | $2.7461 \times 10^{-4}$ |
| $C_{15}$ | $-1.4079 \times 10^{-4}$ | | | | |

FFS⑤

| | | | | | |
|---|---|---|---|---|---|
| $C_4$ | $-4.3551 \times 10^{-2}$ | $C_6$ | $5.9878 \times 10^{-2}$ | $C_8$ | $2.0646 \times 10^{-3}$ |
| $C_{10}$ | $-4.9926 \times 10^{-3}$ | $C_{11}$ | $-1.7369 \times 10^{-4}$ | $C_{13}$ | $-1.0936 \times 10^{-4}$ |
| $C_{15}$ | $7.5800 \times 10^{-4}$ | | | | |

FFS⑥

| | | | | | |
|---|---|---|---|---|---|
| $C_4$ | $6.5080 \times 10^{-4}$ | $C_6$ | $-2.2410 \times 10^{-5}$ | $C_8$ | $-2.9570 \times 10^{-4}$ |
| $C_9$ | $-2.6259 \times 10^{-6}$ | $C_{10}$ | $-7.4227 - 10^{-5}$ | $C_{11}$ | $-4.1108 \times 10^{-5}$ |
| $C_{13}$ | $5.2958 \times 10^{-5}$ | $C_{15}$ | $1.1643 \times 10^{-6}$ | | |

Variable power

FFS⑦W

| | | | | | |
|---|---|---|---|---|---|
| $C_4$ | $2.8402 \times 10^{-3}$ | $C_6$ | $-1.1555 \times 10^{-2}$ | $C_8$ | $-1.0420 \times 10^{-3}$ |
| $C_{10}$ | $4.8213 \times 10^{-5}$ | $C_{11}$ | $1.6364 \times 10^{-4}$ | $C_{13}$ | $3.8292 \times 10^{-5}$ |
| $C_{15}$ | $-6.1324 \times 10^{-6}$ | | | | |

FFS⑦S

| | | | | | |
|---|---|---|---|---|---|
| $C_4$ | $-2.7520 \times 10^{-3}$ | $C_6$ | $-1.1328 \times 10^{-2}$ | $C_8$ | $-1.2111 \times 10^{-3}$ |
| $C_{10}$ | $-3.0933 \times 10^{-5}$ | $C_{11}$ | $9.6838 \times 10^{-5}$ | $C_{13}$ | $6.6490 \times 10^{-6}$ |
| $C_{15}$ | $-3.9623 \times 10^{-6}$ | | | | |

FFS⑦T

| | | | | | |
|---|---|---|---|---|---|
| $C_4$ | $-1.4640 \times 10^{-2}$ | $C_6$ | $-9.8729 \times 10^{-3}$ | $C_8$ | $-1.6695 \times 10^{-3}$ |
| $C_{10}$ | $1.8753 \times 10^{-4}$ | $C_{11}$ | $3.4939 \times 10^{-5}$ | $C_{13}$ | $-1.8607 \times 10^{-6}$ |
| $C_{15}$ | $2.8825 \times 10^{-6}$ | | | | |

FFS⑧

| | | | | | |
|---|---|---|---|---|---|
| $C_4$ | $2.0415 \times 10^{-2}$ | $C_6$ | $4.7335 \times 10^{-3}$ | $C_8$ | $-1.2375 \times 10^{-3}$ |
| $C_{10}$ | $1.5356 \times 10^{-4}$ | $C_{11}$ | $4.8687 \times 10^{-5}$ | $C_{13}$ | $-7.6700 \times 10^{-5}$ |
| $C_{15}$ | $4.5358 \times 10^{-6}$ | | | | |

FFS⑨

| | | | | | |
|---|---|---|---|---|---|
| $C_4$ | $-9.0635 \times 10^{-2}$ | $C_6$ | $4.0474 \times 10^{-2}$ | $C_8$ | $-1.2817 \times 10^{-2}$ |
| $C_{10}$ | $4.3221 \times 10^{-3}$ | $C_{11}$ | $7.6385 \times 10^{-4}$ | $C_{13}$ | $-3.6775 \times 10^{-5}$ |
| $C_{15}$ | $2.8638 \times 10^{-4}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 10.00 |
|---|---|---|---|---|---|
| α | −22.50 | β | 0.00 | γ | 0.00 |

Displacement and tilt(3)

| X | 0.00 | Y | 10.00 | Z | 0.00 |
|---|---|---|---|---|---|
| α | 0.00 | β | 0.00 | γ | 0.00 |

Displacement and tilt(4)

| X | 0.00 | Y | 15.00 | Z | 5.00 |
|---|---|---|---|---|---|
| α | 45.00 | β | 0.00 | γ | 0.00 |

Displacement and tilt(5)

| X | 0.00 | Y | 20.00 | Z | 10.00 |
|---|---|---|---|---|---|
| α | −5.54 | β | 0.00 | γ | 0.00 |

Variable power

| αW | −5.54 | αS | 0.00 | αT | 8.88 |
|---|---|---|---|---|---|

Displacement and tilt(6)

| X | 0.00 | Y | 25.00 | Z | 5.00 |
|---|---|---|---|---|---|
| α | −45.00 | β | 0.00 | γ | 0.00 |

Displacement and tilt(7)

| X | 0.00 | Y | 30.00 | Z | 0.00 |
|---|---|---|---|---|---|
| α | 0.00 | β | 0.00 | γ | 0.00 |

Displacement and tilt(8)

| X | 0.00 | Y | 40.00 | Z | 10.00 |
|---|---|---|---|---|---|
| α | 0.00 | β | 0.00 | γ | 0.00 |

Displacement and tilt(9)

| X | 0.00 | Y | 50.00 | Z | 0.00 |
|---|---|---|---|---|---|
| α | 0.00 | β | 0.00 | γ | 0.00 |

Displacement and tilt(10)

| X | 0.00 | Y | 55.00 | Z | 5.00 |
|---|---|---|---|---|---|
| α | 45.00 | β | 0.00 | γ | 0.00 |

Displacement and tilt(11)

| X | 0.00 | Y | 58.54 | Z | 8.54 |
|---|---|---|---|---|---|
| α | 45.00 | β | 0.00 | γ | 0.00 |

EXAMPLE 10

| Surface No. Object plane | Radius of curvature | Surface separation | Displacement and tilt | Refractive index | Abbe's No. |
|---|---|---|---|---|---|
| 1 | ∞ (Stop) | | (1) | | |
| 2 | FFS① | | (1) | 1.4924 | 57.6 |
| 3 | FFS② (RE) | | (2) | 1.4924 | 57.6 |
| 4 | FFS③ (RE) | | (3) | 1.4924 | 57.6 |
| 5 | FFS④ | | (4) | | |
| 6 | ∞ (RE) | | (5) | | |
| 7 | FFS⑤ | | (6) | 1.4924 | 57.6 |
| 8 | FFS⑥ (RE) | | (7) | 1.4924 | 57.6 |
| 9 | FFS⑦ (RE) | | (8) | 1.4924 | 57.6 |
| 10 | FFS⑧ (RE) | | (9) | 1.4924 | 57.6 |
| 11 | FFS⑨ | | (10) | | |
| Image plane | ∞ | | (11) | | |

FFS①

| | | | | | |
|---|---|---|---|---|---|
| $C_4$ | $-1.5621 \times 10^{-1}$ | $C_5$ | $-6.3242 \times 10^{-2}$ | $C_6$ | $-1.1324 \times 10^{-1}$ |
| $C_7$ | $-3.0843 \times 10^{-2}$ | $C_9$ | $-3.9515 \times 10^{-2}$ | $C_{10}$ | $7.1802 \times 10^{-3}$ |

-continued

| | | | | | |
|---|---|---|---|---|---|
| $C_{11}$ | $-2.0056 \times 10^{-3}$ | $C_{12}$ | $-2.0358 \times 10^{-2}$ | $C_{13}$ | $-1.7460 \times 10^{-2}$ |
| $C_{14}$ | $-1.1170 \times 10^{-2}$ | $C_{15}$ | $-9.7430 \times 10^{-3}$ | | |

FFS②

| | | | | | |
|---|---|---|---|---|---|
| $C_4$ | $-1.7425 \times 10^{-2}$ | $C_5$ | $-8.5226 \times 10^{-3}$ | $C_6$ | $-1.2542 \times 10^{-2}$ |
| $C_7$ | $-7.0668 \times 10^{-4}$ | $C_8$ | $-2.7986 \times 10^{-4}$ | $C_9$ | $-7.3970 \times 10^{-4}$ |
| $C_{10}$ | $8.4429 \times 10^{-5}$ | $C_{11}$ | $2.4539 \times 10^{-5}$ | $C_{12}$ | $7.9814 \times 10^{-5}$ |
| $C_{13}$ | $-3.6493 \times 10^{-5}$ | $C_{14}$ | $4.4273 \times 10^{-5}$ | $C_{15}$ | $-7.0385 \times 10^{-5}$ |

FFS③

| | | | | | |
|---|---|---|---|---|---|
| $C_4$ | $1.2035 \times 10^{-2}$ | $C_5$ | $-1.1670 \times 10^{-2}$ | $C_6$ | $7.4465 \times 10^{-3}$ |
| $C_7$ | $-5.3783 \times 10^{-4}$ | $C_8$ | $-5.9968 \times 10^{-4}$ | $C_9$ | $-2.8172 \times 10^{-4}$ |
| $C_{10}$ | $1.2214 \times 10^{-4}$ | $C_{11}$ | $1.8758 \times 10^{-6}$ | $C_{12}$ | $-1.7419 \times 10^{-5}$ |
| $C_{13}$ | $-2.4859 \times 10^{-5}$ | $C_{14}$ | $-5.8493 \times 10^{-7}$ | $C_{15}$ | $7.2799 \times 10^{-6}$ |

FFS④

| | | | | | |
|---|---|---|---|---|---|
| $C_4$ | $-5.5081 \times 10^{-3}$ | $C_5$ | $-6.4947 \times 10^{-2}$ | $C_6$ | $2.4440 \times 10^{-2}$ |
| $C_7$ | $-2.0766 \times 10^{-3}$ | $C_8$ | $2.7276 \times 10^{-3}$ | $C_9$ | $-3.5336 \times 10^{-3}$ |
| $C_{10}$ | $3.7318 \times 10^{-4}$ | $C_{11}$ | $2.8561 \times 10^{-5}$ | $C_{12}$ | $3.3181 \times 10^{-5}$ |
| $C_{13}$ | $-1.3154 \times 10^{-4}$ | $C_{14}$ | $-2.8686 \times 10^{-4}$ | $C_{15}$ | $4.7601 \times 10^{-5}$ |

FFS⑤

| | | | | | |
|---|---|---|---|---|---|
| $C_4$ | $-1.0186 \times 10^{-1}$ | $C_5$ | $2.6699 \times 10^{-2}$ | $C_6$ | $-4.9334 \times 10^{-2}$ |
| $C_7$ | $-4.8336 \times 10^{-3}$ | $C_8$ | $-5.8462 \times 10^{-3}$ | $C_9$ | $-6.2520 \times 10^{-3}$ |
| $C_{10}$ | $4.0751 \times 10^{-3}$ | $C_{11}$ | $1.4124 \times 10^{-4}$ | $C_{12}$ | $1.6837 \times 10^{-3}$ |
| $C_{13}$ | $6.7839 \times 10^{-4}$ | $C_{14}$ | $-1.2964 \times 10^{-3}$ | $C_{15}$ | $-9.1947 \times 10^{-5}$ |

FFS⑥

| | | | | | |
|---|---|---|---|---|---|
| $C_4$ | $-3.4866 \times 10^{-2}$ | $C_5$ | $2.5768 \times 10^{-3}$ | $C_6$ | $2.4323 \times 10^{-3}$ |
| $C_7$ | $-3.1876 \times 10^{-3}$ | $C_8$ | $-3.2536 \times 10^{-3}$ | $C_9$ | $-4.8376 \times 10^{-4}$ |
| $C_{10}$ | $4.5223 \times 10^{-4}$ | $C_{11}$ | $-1.2781 \times 10^{-4}$ | $C_{12}$ | $1.7794 \times 10^{-4}$ |
| $C_{13}$ | $1.6604 \times 10^{-4}$ | $C_{14}$ | $-1.1368 \times 10^{-4}$ | $C_{15}$ | $-5.5517 \times 10^{-5}$ |

FFS⑦

| | | | | | |
|---|---|---|---|---|---|
| $C_4$ | $-2.4856 \times 10^{-2}$ | $C_5$ | $-3.0864 \times 10^{-3}$ | $C_6$ | $-1.3922 \times 10^{-3}$ |
| $C_7$ | $1.6858 \times 10^{-4}$ | $C_8$ | $-8.1474 \times 10^{-4}$ | $C_9$ | $7.6852 \times 10^{-4}$ |
| $C_{10}$ | $-1.0274 \times 10^{-4}$ | $C_{11}$ | $1.0230 \times 10^{-6}$ | $C_{12}$ | $1.6422 \times 10^{-5}$ |
| $C_{13}$ | $7.9755 \times 10^{-5}$ | $C_{14}$ | $-1.6181 \times 10^{-5}$ | $C_{15}$ | $-1.8359 \times 10^{-5}$ |

FFS⑧

| | | | | | |
|---|---|---|---|---|---|
| $C_4$ | $8.8801 \times 10^{-3}$ | $C_5$ | $-3.5900 \times 10^{-3}$ | $C_6$ | $1.2405 \times 10^{-2}$ |
| $C_7$ | $7.1348 \times 10^{-4}$ | $C_8$ | $4.5103 \times 10^{-4}$ | $C_9$ | $8.6940 \times 10^{-4}$ |
| $C_{10}$ | $1.6190 \times 10^{-4}$ | $C_{11}$ | $-8.9775 \times 10^{-5}$ | $C_{12}$ | $1.1834 \times 10^{-4}$ |
| $C_{13}$ | $-3.9400 \times 10^{-5}$ | $C_{14}$ | $-3.4965 \times 10^{-5}$ | $C_{15}$ | $-2.7196 \times 10^{-5}$ |

FFS⑨

| | | | | | |
|---|---|---|---|---|---|
| $C_4$ | $-1.3729 \times 10^{-2}$ | $C_5$ | $2.9222 \times 10^{-3}$ | $C_6$ | $-4.4155 \times 10^{-3}$ |
| $C_7$ | $-2.6051 \times 10^{-3}$ | $C_8$ | $7.6080 \times 10^{-3}$ | $C_9$ | $-2.4828 \times 10^{-3}$ |
| $C_{10}$ | $-2.5736 \times 10^{-3}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 10.00 |
|---|---|---|---|---|---|
| α | −22.50 | β | 0.00 | γ | 0.00 |

Displacement and tilt(3)

| X | 0.00 | Y | 10.00 | Z | 0.00 |
|---|---|---|---|---|---|
| α | 0.00 | β | 0.00 | γ | 0.00 |

Displacement and tilt(4)

| X | 0.00 | Y | 15.00 | Z | 5.00 |
|---|---|---|---|---|---|
| α | 45.00 | β | 0.00 | γ | 0.00 |

Displacement and tilt(5)

| X | 0.00 | Y | 20.00 | Z | 10.00 |
|---|---|---|---|---|---|
| α | −0.47 | β | 4.26 | γ | 0.00 |

Variable power

| βW | 4.26 | βS | 0.00 | βT | −6.99 |
|---|---|---|---|---|---|

-continued

Displacement and tilt(6)

| X | 0.00 | Y | 25.00 | Z | 5.00 |
|---|---|---|---|---|---|
| α | −45.00 | β | 0.00 | γ | 0.00 |

Displacement and tilt(7)

| X | 0.00 | Y | 30.00 | Z | 0.00 |
|---|---|---|---|---|---|
| α | 0.00 | β | 0.00 | γ | 0.00 |

Displacement and tilt(8)

| X | 0.00 | Y | 40.00 | Z | 10.00 |
|---|---|---|---|---|---|
| α | 0.00 | β | 0.00 | γ | 0.00 |

Displacement and tilt(9)

| X | 0.00 | Y | 50.00 | Z | 0.00 |
|---|---|---|---|---|---|
| α | 0.00 | β | 0.00 | γ | 0.00 |

Displacement and tilt(10)

| X | 0.00 | Y | 55.00 | Z | 5.00 |
|---|---|---|---|---|---|
| α | 45.00 | β | 0.00 | γ | 0.00 |

Displacement and tilt(11)

| X | 0.00 | Y | 58.54 | Z | 8.54 |
|---|---|---|---|---|---|
| α | 45.00 | β | 0.00 | γ | 0.00 |

EXAMPLE 11

| Surface No. | Radius of curvature | Surface separation | Displacement and tilt | Refractive index | Abbe's No. |
|---|---|---|---|---|---|
| Object plane | ∞ | ∞ | | | |
| 1 | FFS① | | (1) | 1.4924 | 57.6 |
| 2 | FFS② (RE) | | (2) | 1.4924 | 57.6 |
| 3 | FFS③ (RE) | | (3) | 1.4924 | 57.6 |
| 4 | FFS④ | | (4) | | |
| 5 | ∞ | | (5) | | |
| 6 | FFS⑤ | | (6) | 1.4924 | 57.6 |
| 7 | FFS⑥ (RE) | | (7) | 1.4924 | 57.6 |
| 8 | FFS⑦ (RE) (Stop) | | (8) | 1.4924 | 57.6 |
| 9 | FFS⑧ | | (9) | | |
| Image plane | ∞ | | (10) | | |

FFS①

| | | | | | |
|---|---|---|---|---|---|
| $C_4$ | $-3.9466 \times 10^{-2}$ | $C_6$ | $-7.6935 \times 10^{-3}$ | $C_8$ | $6.2421 \times 10^{-4}$ |
| $C_{10}$ | $3.4981 \times 10^{-4}$ | | | | |

FFS②

| | | | | | |
|---|---|---|---|---|---|
| $C_4$ | $-2.4607 \times 10^{-2}$ | $C_6$ | $-4.6921 \times 10^{-3}$ | $C_8$ | $-2.6926 \times 10^{-4}$ |
| $C_{10}$ | $6.9363 \times 10^{-5}$ | | | | |

FFS③

| | | | | | |
|---|---|---|---|---|---|
| $C_4$ | $-5.3043 \times 10^{-3}$ | $C_6$ | $2.7581 \times 10^{-3}$ | $C_8$ | $1.0226 \times 10^{-4}$ |
| $C_{10}$ | $9.3278 \times 10^{-5}$ | | | | |

FFS④

| | | | | | |
|---|---|---|---|---|---|
| $C_4$ | $-4.9315 \times 10^{-2}$ | $C_6$ | $-4.3520 \times 10^{-2}$ | $C_8$ | $2.0999 \times 10^{-3}$ |
| $C_{10}$ | $2.5138 \times 10^{-3}$ | | | | |

FFS⑤

| | | | | | |
|---|---|---|---|---|---|
| $C_4$ | $-3.3525 \times 10^{-2}$ | $C_6$ | $-2.4961 \times 10^{-2}$ | $C_8$ | $-4.9643 \times 10^{-4}$ |
| $C_{10}$ | $-6.1872 \times 10^{-5}$ | | | | |

FFS⑥

| | | | | | |
|---|---|---|---|---|---|
| $C_4$ | $3.3480 \times 10^{-3}$ | $C_6$ | $-4.7598 \times 10^{-3}$ | $C_8$ | $3.4254 \times 10^{-4}$ |
| $C_{10}$ | $8.4590 \times 10^{-4}$ | | | | |

-continued

FFS⑦

| | | | | | |
|---|---|---|---|---|---|
| $C_4$ | $1.7254 \times 10^{-2}$ | $C_6$ | $1.8557 \times 10^{-2}$ | $C_8$ | $-9.1136 \times 10^{-4}$ |
| $C_{10}$ | $-5.2750 \times 10^{-4}$ | | | | |

FFS⑧

| | | | | | |
|---|---|---|---|---|---|
| $C_4$ | $-1.2819 \times 10^{-1}$ | $C_6$ | $-5.9397 \times 10^{-2}$ | $C_8$ | $3.0845 \times 10^{-2}$ |

Displacement and tilt(1)

| X | 0.00 | Y | 0.00 | Z | 0.00 |
|---|---|---|---|---|---|
| α | 42.44 | β | 0.00 | γ | 0.00 |

Displacement and tilt(2)

| X | 0.00 | Y | 0.36 | Z | 7.60 |
|---|---|---|---|---|---|
| α | −19.18 | β | 0.00 | γ | 0.00 |

Displacement and tilt(3)

| X | 0.00 | Y | 12.53 | Z | −1.51 |
|---|---|---|---|---|---|
| α | 0.26 | β | 0.00 | γ | 0.00 |

Displacement and tilt(4)

| X | 0.00 | Y | 23.72 | Z | 6.72 |
|---|---|---|---|---|---|
| α | 67.81 | β | 0.00 | γ | 0.00 |

Displacement and tilt(5)

| X | 0.00 | Y | 27.89 | Z | 10.69 |
|---|---|---|---|---|---|
| α | −6.66 | β | 0.00 | γ | 0.00 |

Variable power

| αW | −6.66 | αS | 0.00 | αT | 6.24 |
|---|---|---|---|---|---|

Displacement and tilt(6)

| X | 0.00 | Y | 32.87 | Z | 5.95 |
|---|---|---|---|---|---|
| α | −97.34 | β | 0.00 | γ | 0.00 |

Displacement and tilt(7)

| X | 0.00 | Y | 47.39 | Z | −0.52 |
|---|---|---|---|---|---|
| α | −81.69 | β | 0.00 | γ | 0.00 |

Displacement and tilt(8)

| X | 0.00 | Y | 37.99 | Z | −1.74 |
|---|---|---|---|---|---|
| α | 45.65 | β | 0.00 | γ | 0.00 |

Displacement and tilt(9)

| X | 0.00 | Y | 39.58 | Z | 8.66 |
|---|---|---|---|---|---|
| α | 25.35 | β | 0.00 | γ | 0.00 |

Displacement and tilt(10)

| X | 0.00 | Y | 39.51 | Z | 10.66 |
|---|---|---|---|---|---|
| α | 180.00 | β | 0.00 | γ | 0.00 |

Figure 14:
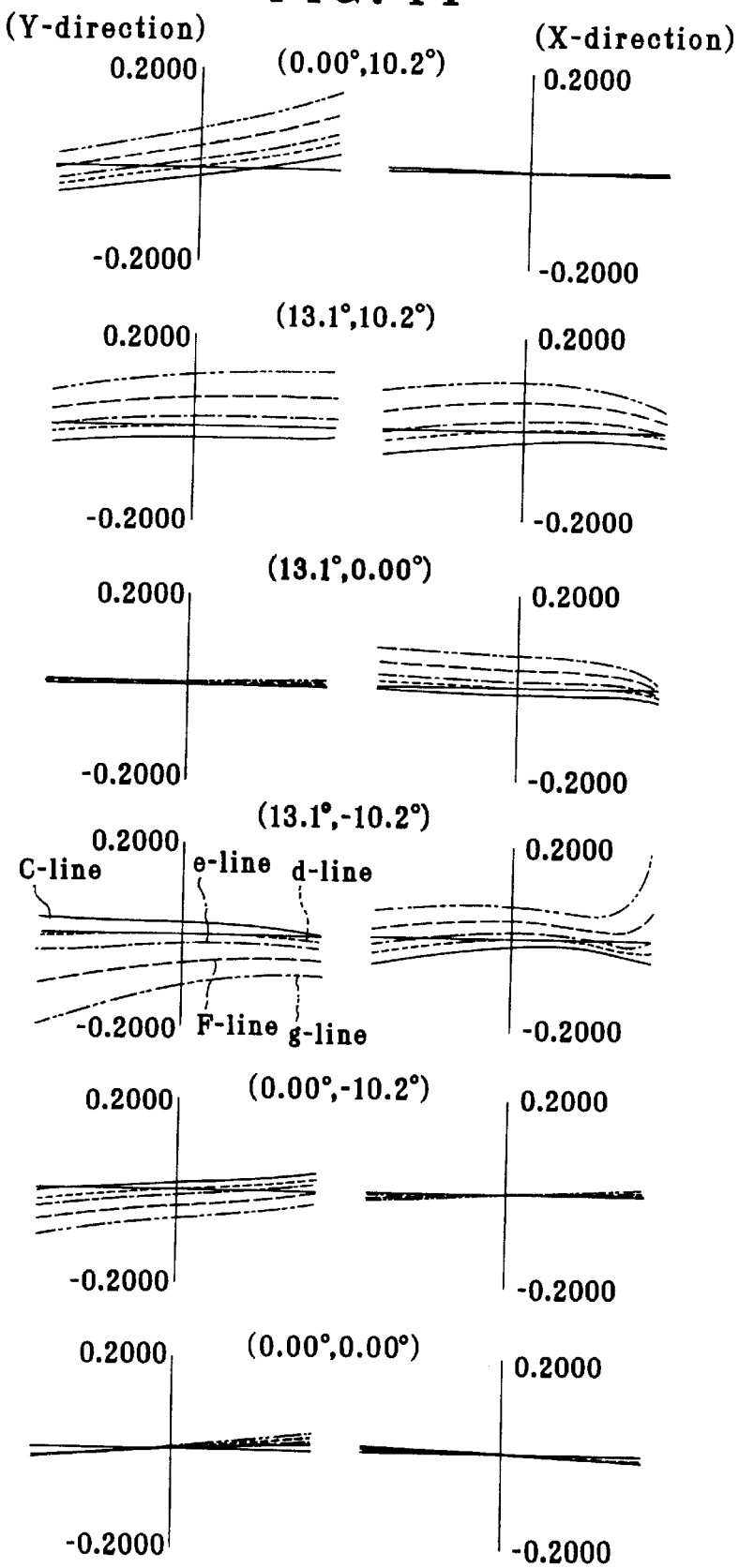
FIG. 14 is an aberrational diagram illustrating lateral aberrations produced at the wide-angle end in Example 3.
Figure 15:
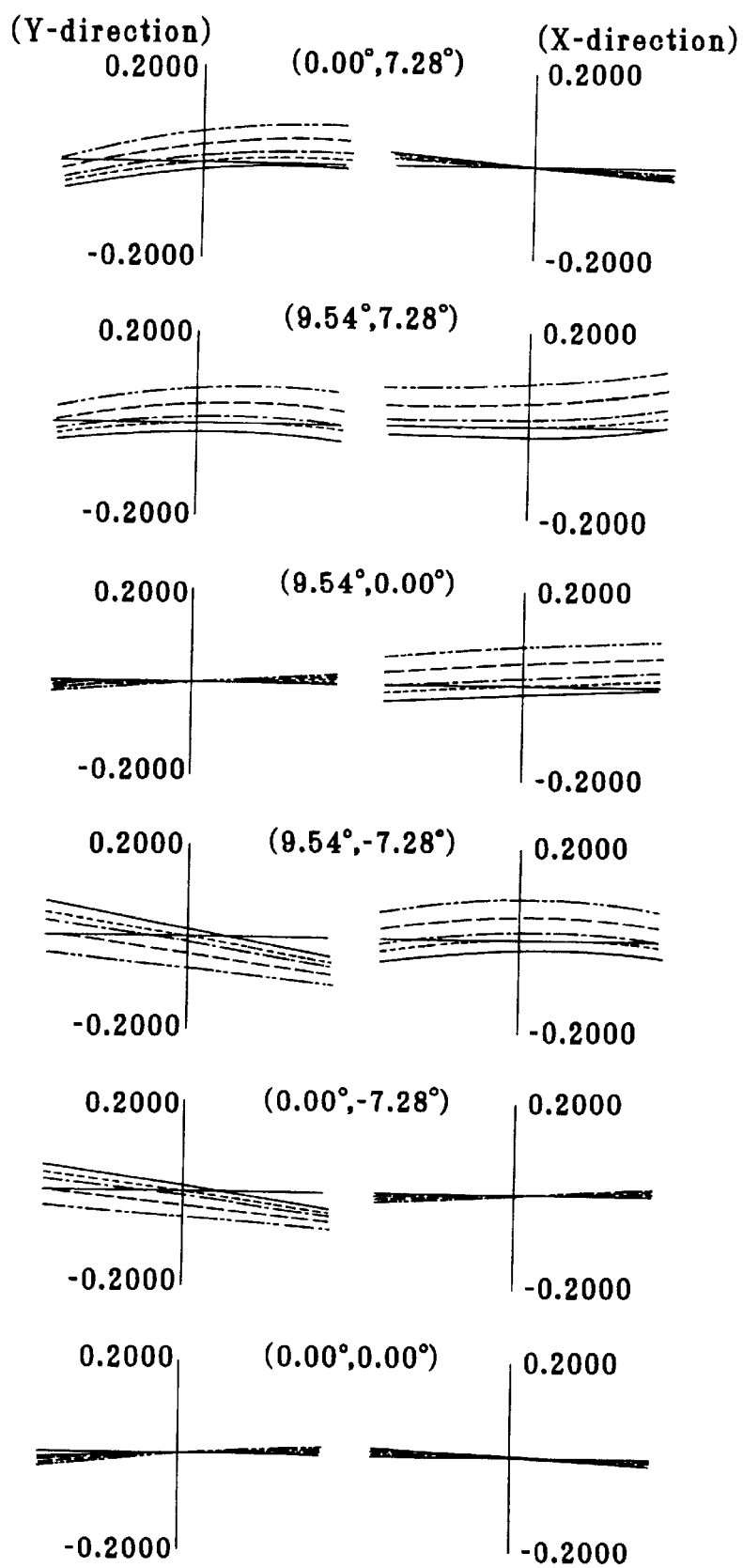
FIG. 15 is an aberrational diagram illustrating lateral aberrations produced at the standard position in Example 3.
Figure 16:
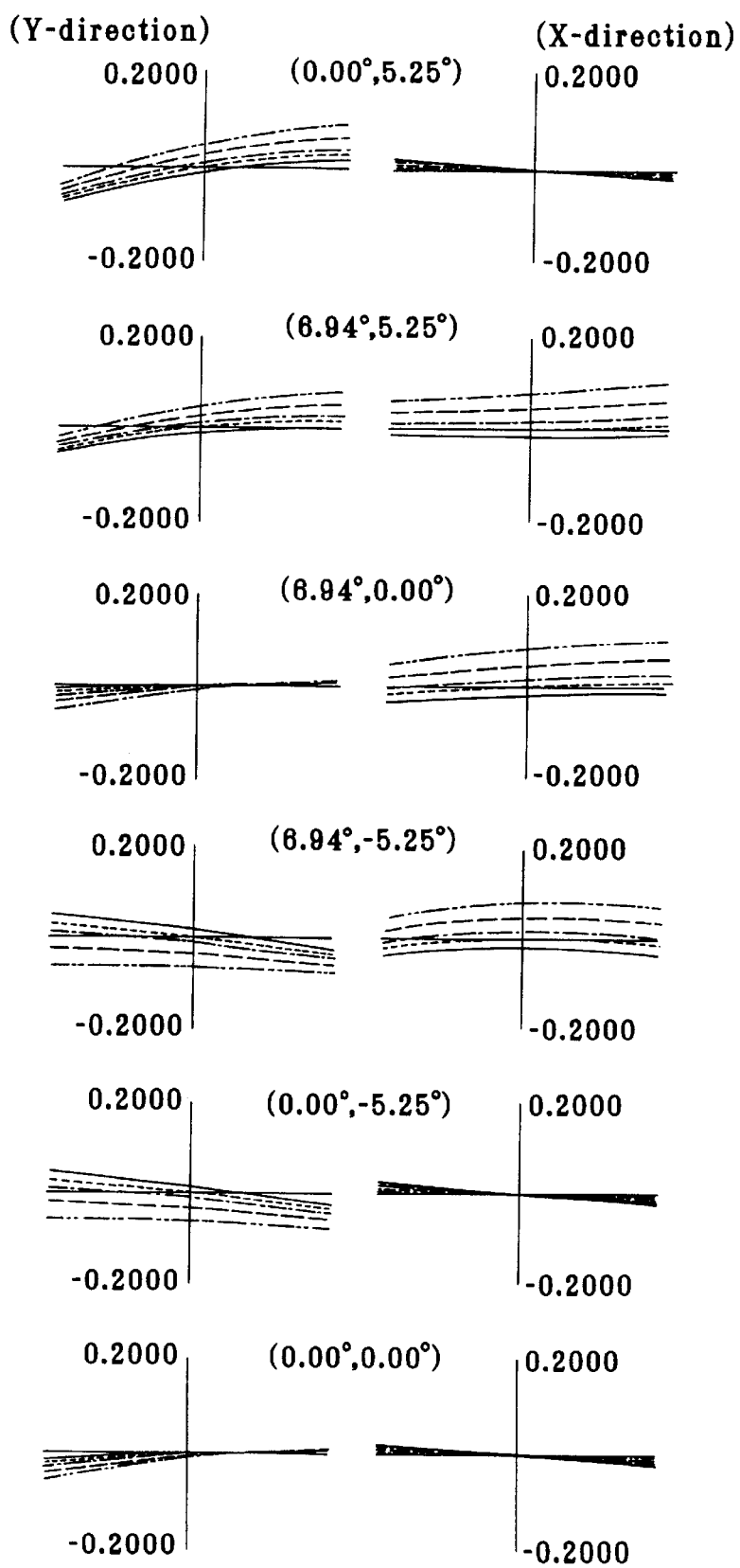
FIG. 16 is an aberrational diagram illustrating lateral aberrations produced at the telephoto end in Example 3.
Figure 17:
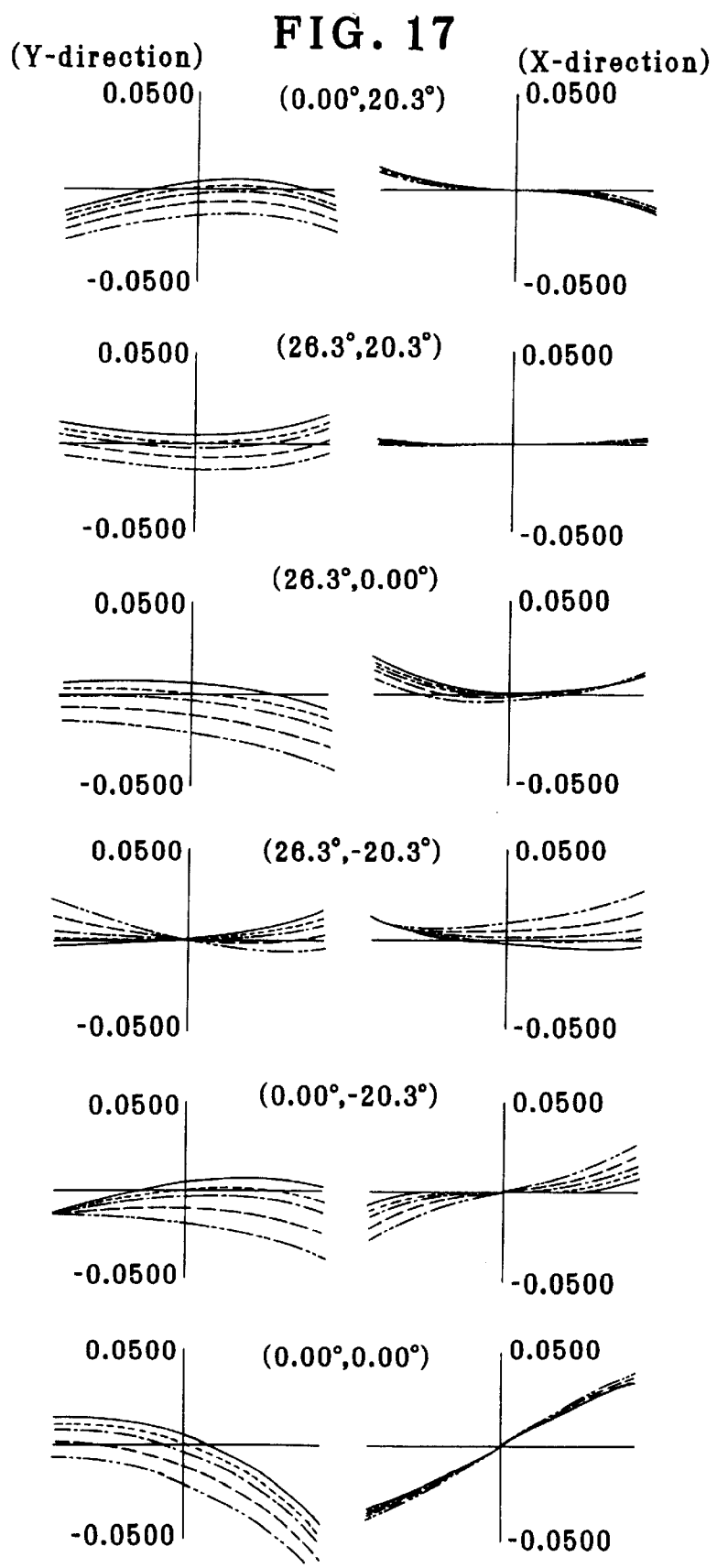
FIG. 17 is an aberrational diagram illustrating lateral aberrations produced at the wide-angle end in Example 5.
Figure 18:
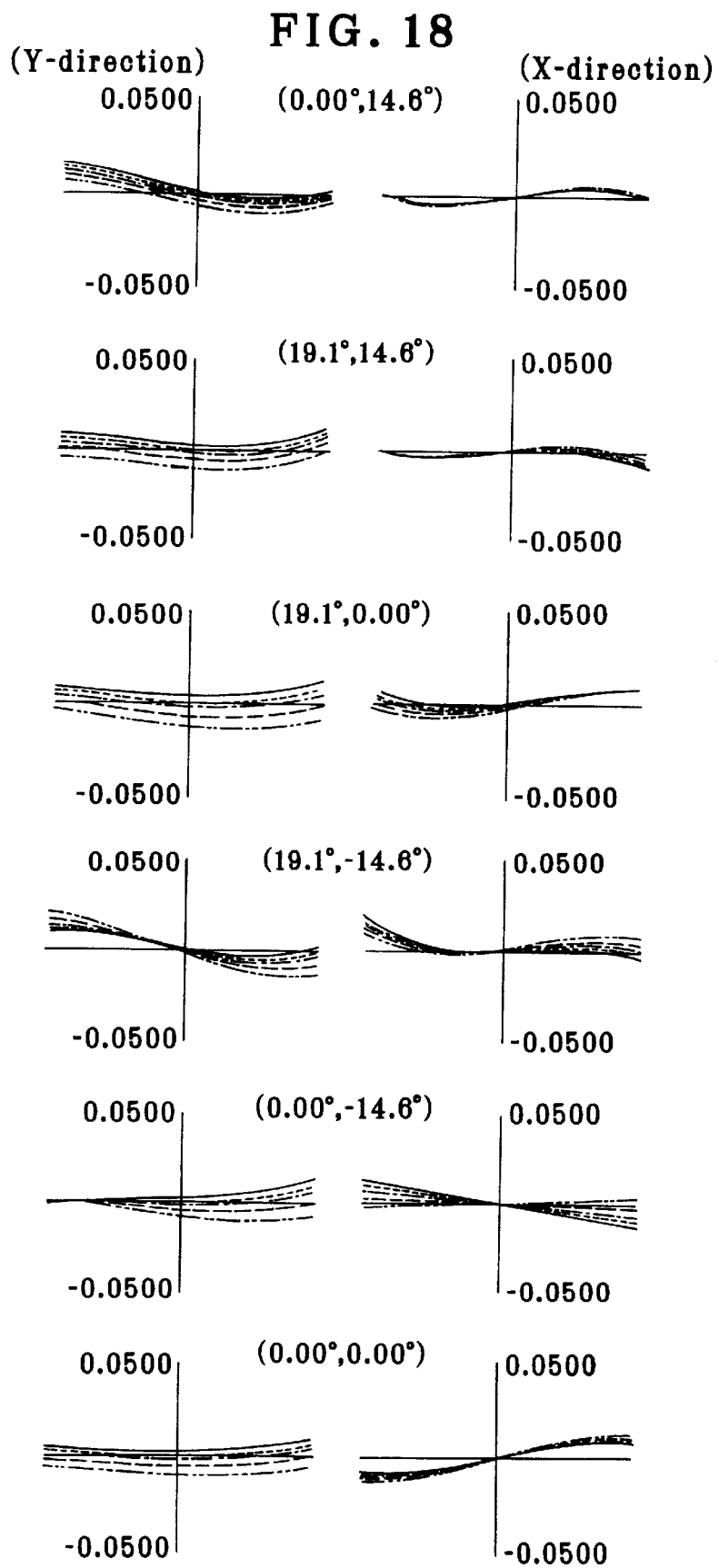
FIG. 18 is an aberrational diagram illustrating lateral aberrations produced at the standard position in Example 5.
Figure 19:
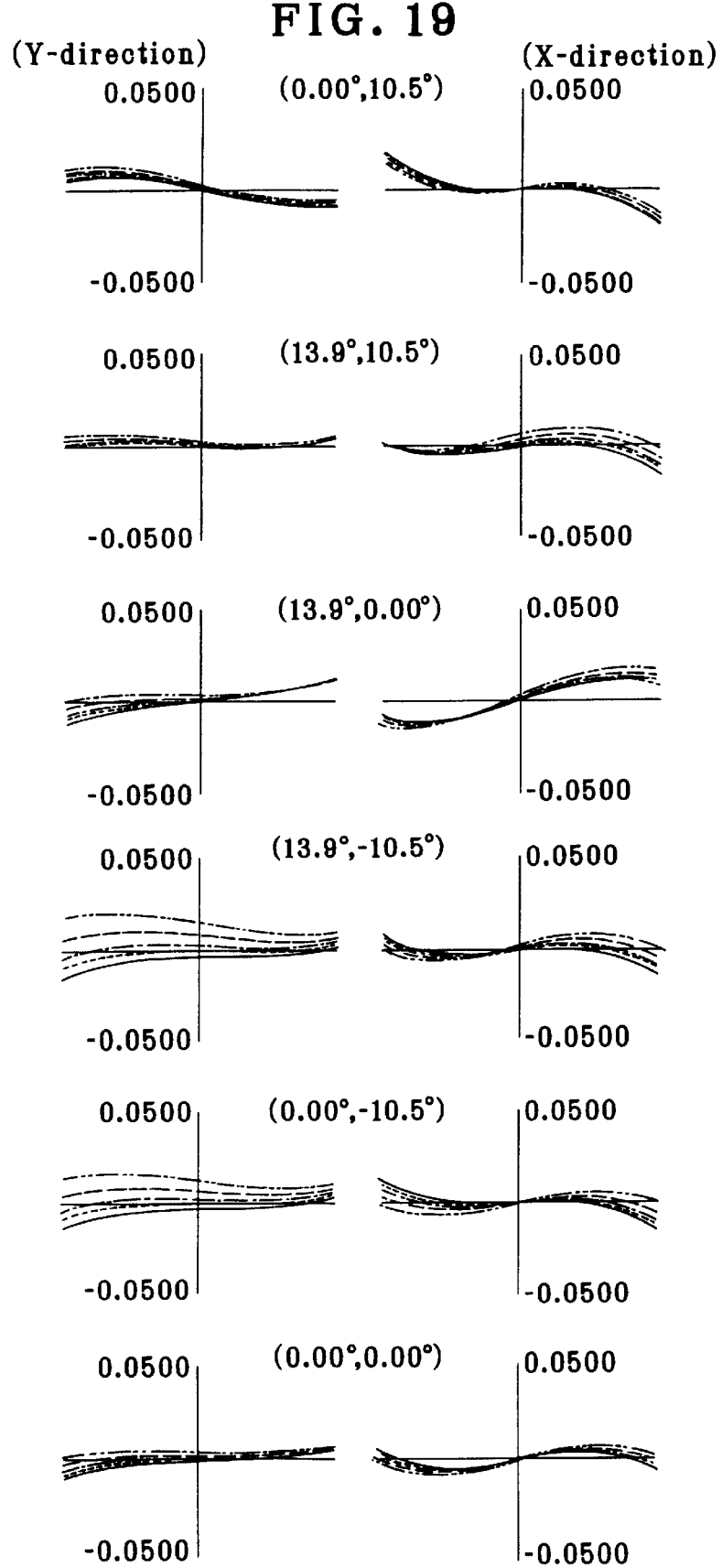
FIG. 19 is an aberrational diagram illustrating lateral aberrations produced at the telephoto end in Example 5.

FIGS. 14, 15 and 16 illustrate lateral aberrations produced at the wide-angle, standard position and telephoto end, respectively, in the above-described Example 3. FIGS. 17, 18 and 19 similarly illustrate lateral aberrations in Example 5. In these diagrams showing lateral aberrations, the numerals in the parentheses denote (horizontal field angle, vertical field angle), and lateral aberrations at the field angles are shown.

In the present invention, the structure of the optical system need not stick to the above-described numerical examples. The first image formed by the first unit may be not only a real image but also a virtual image. Further, it is not always necessary to form a real first image.

Although the first unit is formed from a single optical element, it is also possible to form the first unit from a plurality of optical elements. This structure is preferable from the viewpoint of aberration correction.

The object of the present invention is to change parameters of an optical element, such as the focal length, magnification, principal point position, and image-formation position. Therefore, the present invention can be used for focus adjustment with an arrangement approximately the same as those in the described Examples.

In the present invention, the optical system is described as being a two-unit optical system having a first unit and a second unit for the sake of convenience. In this regard, the present invention adopts a zooming or focusing mechanism that is basically not accompanied with the movement of an optical element. Therefore, the way in which the first and second units are divided from each other is different from that in the lens unit arrangement of conventional zoom lenses in which zooming is performed by changing the spacing between the lens units.

Although zooming has mainly been described in the foregoing Examples, it is also possible to perform zooming, focusing, etc. independently of each other with three reflecting mirrors. That is, a plurality of prism optical systems are combined together, and reflecting mirrors are provided for a pupil and an image that are relayed, whereby zooming, focusing, etc. are effected independently of each other with three reflecting mirrors. Further, it is possible to effect two of zooming, focusing and so forth with a single reflecting mirror by rotating the reflecting mirror about axes of rotation perpendicularly intersecting each other.

As will be clear from the foregoing description, it is possible according to the present invention to provide a variable focal length optical element and an optical system capable of changing optical parameters to effect magnification adjustment, focus adjustment, etc. with a simple arrangement in which an aperture or a reflecting mirror in the optical element or the optical system is moved.

I claim:

1. A variable focal length optical element having at least one continuous rotationally asymmetric surface, wherein an optical power is variable by selecting an optical path through an aperture.

2. A variable focal length optical element according to claim 1, wherein at least either one of a focal length and an image-formation position is adjustable by moving said aperture in a direction approximately perpendicular to an optical axis.

3. A variable focal length optical element according to claim 2, wherein a relationship A between a size D of said aperture and an amount of movement d of said aperture, i.e. A=D/d, satisfies the following condition:

$$0.01 < A < 1 \qquad (1).$$

4. An optical system having at least two optical elements, said optical system comprising:

a first unit positioned at an object side of said optical system to form a first image;

a second unit for projecting said first image onto an image plane; and optical path selecting means for selecting an optical path, said optical path selecting means being positioned in a vicinity of said first image;

wherein one of said first unit and said second unit comprises a variable focal length optical element having at least two continuous rotationally asymmetric surfaces.

5. An optical system according to claim 4, wherein at least said second unit comprises a variable focal length optical element having at least two continuous rotationally asymmetric surfaces, and said optical path selecting means is light-deflecting means positioned in a vicinity of said first image to change a position and direction of a light beam entering said second unit, thereby adjusting at least one of a focal length, an image-formation position, an image-formation magnification, and a principal point position.

6. An optical system according to claim 4, wherein at least said first unit comprises a variable focal length optical element having at least two continuous rotationally asymmetric surfaces, and an aperture for forming an exit pupil is positioned in said second unit, wherein a position of an entrance pupil conjugate to the aperture positioned in said second unit is moved relative to said first unit by said optical path selecting means positioned in the vicinity of said first image, thereby adjusting at least one of a focal length, an image-formation position, an image-formation magnification, and a principal point position.

7. An optical system according to any one of claims 4 to 6, wherein a width a of oscillation of an axial principal ray caused by said optical path selecting means satisfies the following condition:

$$0° < \alpha < 90° \tag{2}$$

8. A variable focal length optical element having at least one discontinuous rotationally asymmetric surface, wherein an optical power is variable by selecting an optical path through an aperture.

9. A variable focal length optical element according to claim 8, wherein at least either one of a focal length and an image-formation position is adjustable by moving said aperture in a direction approximately perpendicular to an optical axis.

10. A variable focal length optical element according to claim 8, wherein a width a of oscillation of an axial principal ray caused by optical path selecting means satisfies the following condition:

$$0° < \alpha < 90° \tag{2}$$

11. A variable focal length optical element or optical system according to claim 1 or 4, wherein the following condition is satisfied:

$$0.5 < |Fy/Fx| < 2 \tag{5}$$

where, when a direction of decentration of said optical element or optical system is defined as a Y-axis direction, and a plane parallel to an axial principal ray is defined as a YZ-plane, and further a direction perpendicularly intersecting the YZ-plane is defined as an X-axis direction, Fx and Fy are focal lengths in the X-axis direction and the Y-axis direction, respectively, of said optical element or optical system.

12. A variable focal length optical element or optical system according to claim 1 or 4, which is used as an image pickup optical system.

13. A variable focal length optical element or optical system according to claim 1 or 4, which is used as a projection optical system.

14. A variable focal length optical element or optical system according to claim 1 or 4, which is used as an ocular optical system.

* * * * *